(12) United States Patent
Yang et al.

(10) Patent No.: US 10,284,712 B2
(45) Date of Patent: May 7, 2019

(54) VOICE QUALITY EVALUATION METHOD, APPARATUS, AND SYSTEM

(71) Applicant: Huawei Technologies Co., Ltd., Shenzhen (CN)

(72) Inventors: Fuzheng Yang, Xi'an (CN); Xuemin Li, Xi'an (CN); Liangliang Jiang, Xi'an (CN); Wei Xiao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 15/248,079

(22) Filed: Aug. 26, 2016

(65) Prior Publication Data

US 2016/0366274 A1   Dec. 15, 2016

Related U.S. Application Data

(63) Continuation of application No. PCT/CN2014/089401, filed on Oct. 24, 2014.

(30) Foreign Application Priority Data

May 5, 2014   (CN) .......................... 2014 1 0186706

(51) Int. Cl.
 *H04M 3/22*   (2006.01)
 *H04M 7/00*   (2006.01)
 (Continued)

(52) U.S. Cl.
 CPC ............... *H04M 3/22* (2013.01); *G10L 25/69* (2013.01); *H04L 43/08* (2013.01);
 (Continued)

(58) Field of Classification Search
 None
 See application file for complete search history.

(56) References Cited

U.S. PATENT DOCUMENTS

2002/0065648 A1*   5/2002   Amano ................... G10L 19/00
                                                          704/216
2007/0008899 A1    1/2007   Shim et al.
 (Continued)

FOREIGN PATENT DOCUMENTS

CN   101188525 A   5/2008
CN   101467472 A   6/2009
 (Continued)

OTHER PUBLICATIONS

Machine Translation and Abstract of Chinese Publication No. CN101188525, May 28, 2008, 14 pages.
 (Continued)

*Primary Examiner* — Jason E Mattis
*Assistant Examiner* — Hong Shao
(74) *Attorney, Agent, or Firm* — Conley Rose, P.C.

(57) ABSTRACT

A voice quality evaluation method, apparatus, and system comprises an obtained voice data packet is parsed, and a frame content characteristic of the data packet is determined according to a parse result, for example, the frame content characteristic is a silence frame and a voice frame. Then, a voice sequence is divided into statements according to the determined frame content characteristic, and the statements are divided into multiple frame loss events; after non-voice parameters are extracted according to the frame loss events, voice quality of each statement is evaluated according to a preset voice quality evaluation model and according to the non-voice parameters. Finally, voice quality of the entire voice sequence is evaluated according to the voice quality of each statement. By using this solution, prediction precision can be improved significantly, and accuracy of an evaluation result can be improved.

9 Claims, 5 Drawing Sheets

(51) Int. Cl.
*H04L 12/26* (2006.01)
*G10L 25/69* (2013.01)
*G10L 19/005* (2013.01)

(52) U.S. Cl.
CPC ......... *H04M 3/2236* (2013.01); *H04M 7/006* (2013.01); *G10L 19/005* (2013.01)

(56) References Cited

U.S. PATENT DOCUMENTS

| | | | | |
|---|---|---|---|---|
| 2008/0212567 | A1* | 9/2008 | El-Hennawey | G10L 25/69 370/352 |
| 2010/0002688 | A1 | 1/2010 | Yeom | |
| 2011/0251845 | A1 | 10/2011 | Arakawa et al. | |
| 2012/0281589 | A1 | 11/2012 | Ozawa | |
| 2013/0191120 | A1* | 7/2013 | Zopf | G10L 19/005 704/228 |
| 2014/0146695 | A1* | 5/2014 | Kim | H04L 65/601 370/252 |
| 2015/0179187 | A1 | 6/2015 | Xiao et al. | |

FOREIGN PATENT DOCUMENTS

| | | |
|---|---|---|
| CN | 102057634 A | 5/2011 |
| CN | 102340426 A | 2/2012 |
| CN | 102496372 A | 6/2012 |
| CN | 103632679 A | 3/2014 |
| CN | 103632680 A | 3/2014 |
| CN | 103716470 A | 4/2014 |
| CN | 103839554 A | 6/2014 |
| EP | 1441329 A1 | 7/2004 |
| EP | 1899961 A1 | 3/2008 |
| EP | 2525353 A1 | 11/2012 |
| WO | 2007005875 A1 | 1/2007 |

OTHER PUBLICATIONS

Machine Translation and Abstract of Chinese Publication No. CN103839554, Jun. 4, 2014, 24 pages.

Yang, F., et al., "Real-time quality assessment for voice over IP," Concurrency and Computation: Practice and Experience, Sep. 17, 2011, 8 pages.

Foreign Communication From a Counterpart Application, Chinese Application No. 201410186706.1, Chinese Office Action dated Jun. 27, 2017, 8 pages.

Machine Translation and Abstract of Chinese Patent Application No. CN201010238631, Chinese Publication No. CN102340426, Feb. 1, 2012, 22 pages.

Machine Translation and Abstract of Chinese Patent Application No. CN201110421168, Chinese Publication No. CN102496372, Jun. 13, 2012, 5 pages.

"Series P: Telephone Transmission Quality, Telephone Installations, Local Line Networks, Objective measuring apparatus, Single-ended method for objective speech quality assessment in narrow-band telephony applications," ITU-T, P.563, May 2004, 66 pages.

Egi, N., et al., "Parametric Packet-Layer Model for Evaluation Audio Quality in Multimedia Streaming Services," IEICE Trans. Commun., vol. E93-B, No. 6, Jun. 2010, pp. 1359-1366.

Sjoberg, J., et al., "Real-Time Transport Protocol (RTP) Payload Format and File Storage Format for the Adaptive Multi-Rate (AMR) and Adaptive Multi-Rate Wideband (AMR-WB) Audio Codecs," RFC 3267, Jun. 2002, 49 pages.

"Series G: Transmission Systems and Media, Digital Systems and Networks, International telephone connection and circuits—Transmission planning and the E-model, The E-model: a computational model for use in transmission planning" ITU-T, G.107, Feb. 2014, 30 pages.

"Series G: Transmission Systems and Media, Digital Systems and Networks, Multimedia Quality of Service and performance—Generic and user-related aspects, Opinion model for video-telephony applications," ITU-T, G.1070, Jul. 2012, 30 pages.

"Series P: Telephone Transmission Quality, Telephone Installations, Local Line Networks, Methods for objective and subjective assessment of qualit, Perceptual evaluation of speech quality (PESQ): An Objective Method for end-to-end speech quality assessment of narrow-band telephone networks and speech codecs, Corrigendum 1" ITU-T, P.862, Corrigendum 1, Oct. 2007, 8 pages.

"Series P: Terminals and Subjective and Objective Assessment Methods, Models and tools for quality assessment of streamed media, Parametric non-intrusive assessment of audiovisual media streaming quality," ITU-T, P.1201, Oct. 2012, 32 pages.

Uemura, S., et al., "Objective Speech Quality Assessment Based on Payload Discrimination of Lost Packets for Cellular Phones in NGN Environment," IEICE Trans. Commun., vol. E91-B, No. 11, Nov. 2008, pp. 3667-3676.

Jelassi, S., et al., "Quality of Experience of VoIP Service: A Survey of Assessment Approaches and Open Issues," IEEE Communications Surveys and Tutorials, vol. 14, No. 2, Second Quarter, 2012, pp. 491-513.

Ding, L., et al., "Non-intrusive single-ended speech quality assessment in VoIP," Elsevier, Science Direct, Speech Communication 49, 2007, pp. 477-489.

Foreign Communication From a Counterpart Application, European Application No. 14891207.4, Extended European Search Report dated Apr. 3, 2017, 12 pages.

Foreign Communication From a Counterpart Application, PCT Application No. PCT/CN2014/089401, English Translation of International Search Report dated Feb. 3, 2015, 2 pages.

Foreign Communication From a Counterpart Application, PCT Application No. PCT/CN2014/089401, English Translation of Written Opinion dated Feb. 3, 2015, 9 pages.

\* cited by examiner $N_{01}=2 \quad L_1=2 \quad N_{02}=1 \quad L_2=3 \quad N_{03}=2 \quad L_3=2 \quad N_{04}=1$

VOICE QUALITY EVALUATION METHOD, APPARATUS, AND SYSTEM

CROSS-REFERENCE TO RELATED APPLICATIONS

This application is a continuation application of international application number PCT/CN2014/089401 filed on Oct. 24, 2014, which claims priority to Chinese patent application number 201410186706.1 filed on May 5, 2014, both of which are incorporated by reference.

TECHNICAL FIELD

The present application relates to the field of communications technologies, and specifically, to a voice quality evaluation method, apparatus, and system.

BACKGROUND

In recent years, Voice over Internet Protocol (VoIP) develops rapidly. Compared with a traditional phone, VoIP has advantages such as occupation of few network resources and low costs. However, an Internet Protocol (IP) network provides only best effort services, and voice may be affected in a transmission process by multiple network factors such as packet loss, which leads to voice quality deterioration. By monitoring and feeding back voice quality, compression or transmission parameters can be adjusted to improve the voice quality. Therefore, how to measure and evaluate the voice quality accurately and reliably in real time is critical in network measurement and network planning.

According to a type of information input into a model and accessed bit stream content, voice quality evaluation methods may be classified into: a parameter planning model, a packet layer model, a bit stream layer model, a media layer model, a hybrid model, and the like. A voice quality evaluation method based on the packet layer model allows only voice quality evaluation to be performed by analyzing packet header information of a voice packet, and has low calculation complexity and is applicable to a case in which data packet payload information cannot be accessed. However, a voice quality evaluation method based on the bit stream layer model allows not only analysis of packet header information of a voice data packet, but also analysis of voice load information and even voice decoding; for example, a waveform of a voice signal is analyzed to obtain more detailed packet loss information and distortion information, so as to obtain prediction quality that is more precise than the voice quality evaluation method based on the packet layer model; but calculation complexity of this method is higher than that of the packet layer model. Therefore, the two methods have their respective advantages, and are two common voice quality evaluation methods. However, both the voice quality evaluation method based on the packet layer model and the voice quality evaluation method based on the bit stream layer model generally use an average compression bit rate of voice to evaluate compression distortion, and use an average packet loss rate to evaluate distortion caused by packet loss; and then evaluate the voice quality according to the compression distortion and the distortion caused by packet loss.

In a process of researching and practicing those approaches, an inventor of the present application finds that composition of voice is complex, for example, a case in which silence (for example, a talk interval) often occurs in the voice, but voice quality is measured according to only average distortion information in an existing solution. Therefore, prediction precision is not high, and an evaluation result is not accurate enough.

SUMMARY

Embodiments of the present application provide a voice quality evaluation method, apparatus, and system, and can improve prediction precision and accuracy of an evaluation result.

According to a first aspect, an embodiment of the present application provides a voice quality evaluation method, including: obtaining a voice data packet, where the voice data packet includes a voice sequence; parsing the data packet to obtain a parse result; determining a frame content characteristic of the data packet according to the parse result, where the frame content characteristic includes a silence frame and a voice frame; dividing the voice sequence into statements according to the determined frame content characteristic, and dividing the statements obtained by means of division into multiple frame loss events; extracting non-voice parameters according to the frame loss events, where the non-voice parameters include a location parameter and a discrete distribution parameter; evaluating voice quality of each statement according to a preset voice quality evaluation model and according to the non-voice parameters to obtain the voice quality of each statement; and evaluating voice quality of the voice sequence according to the voice quality of each statement.

With reference to the first aspect, in a first possible implementation manner, the parsing the data packet to obtain a parse result includes: parsing a packet header of the data packet to obtain a parse result, where the parse result includes duration of the voice sequence, a bit quantity of the voice sequence, a frame loss location, and voice load; and the determining a frame content characteristic of the data packet according to the parse result includes: determining, in the data packet according to the frame loss location, a frame loss part that currently needs to be detected, determining a frame content characteristic of a previous adjacent non-lost frame and a frame content characteristic of a subsequent adjacent non-lost frame of the frame loss part separately according to the duration of the voice sequence, the bit quantity of the voice sequence, and the voice load, and determining a frame content characteristic of the frame loss part according to the frame content characteristic of the previous adjacent non-lost frame, the frame content characteristic of the subsequent adjacent non-lost frame, and a mark of the subsequent adjacent non-lost frame.

With reference to the first possible implementation manner of the first aspect, in a second possible implementation manner, the determining a frame content characteristic of a non-lost frame according to the duration of the voice sequence, the bit quantity of the voice sequence, and the voice load includes: obtaining an actual valid payload length of the non-lost frame; determining a bit rate according to the voice load, the bit quantity of the voice sequence, and the duration of the voice sequence; and if a standard valid payload length corresponding to the bit rate is consistent with the actual valid payload length, determining that the non-lost frame is a voice frame; or if a standard valid payload length corresponding to the bit rate is inconsistent with the actual valid payload length, determining that the non-lost frame is a silence frame.

With reference to the second possible implementation manner of the first aspect, in a third possible implementation manner, the determining a frame content characteristic of the frame loss part according to the frame content characteristic of the previous adjacent non-lost frame, the frame content characteristic of the subsequent adjacent non-lost frame, and a mark of the subsequent adjacent non-lost frame includes: if both the previous adjacent non-lost frame and the subsequent adjacent non-lost frame are silence frames or the mark of the subsequent adjacent non-lost frame indicates that the subsequent adjacent non-lost frame is a first voice frame, determining that the frame loss part is a silence frame; otherwise, determining that the frame loss part is a voice frame.

With reference to the third possible implementation manner of the first aspect, in a fourth possible implementation manner, the voice frame includes a key voice frame and a non-key voice frame, and then the determining that the frame loss part is a voice frame includes: when both the previous adjacent non-lost frame and the subsequent adjacent non-lost frame are voice frames, determining that the frame loss part is a key voice frame; when the previous adjacent non-lost frame is a voice frame and the subsequent adjacent non-lost frame is a silence frame, determining that a first half of the frame loss part is a key voice frame and a second half of the frame loss part is a non-key voice frame; or when the previous adjacent non-lost frame is a silence frame and the subsequent adjacent non-lost frame is a voice frame, determining that a first half of the frame loss part is a non-key voice frame and a second half of the frame loss part is a key voice frame.

With reference to the first aspect, in a fifth possible implementation manner, the parsing the data packet to obtain a parse result includes: parsing a packet header of the data packet to obtain a parse result, where the parse result includes duration of the voice sequence, a bit quantity of the voice sequence, a frame loss location, and voice load; performing adaptive multi-rate (AMR) decoding according to the voice load to obtain an AMR-decoded voice signal; and calculating a frame energy and an average frame energy that are of each frame in the AMR-decoded voice signal according to the duration of the voice sequence and the bit quantity of the voice sequence; and the determining a frame content characteristic of the data packet according to the parse result includes: determining, in the data packet according to the frame loss location, a frame loss part that currently needs to be detected, determining a frame content characteristic of a previous adjacent non-lost frame and a frame content characteristic of a subsequent adjacent non-lost frame of the frame loss part according to the calculated frame energy and average frame energy, and determining a frame content characteristic of the frame loss part according to the frame content characteristic of the previous adjacent non-lost frame and the frame content characteristic of the subsequent adjacent non-lost frame.

With reference to the fifth possible implementation manner of the first aspect, in a sixth possible implementation manner, the determining a frame content characteristic of a non-lost frame according to the calculated frame energy and average frame energy includes: if a frame energy of the non-lost frame is less than or equal to 0, determining that the non-lost frame is a silence frame; if a frame energy of the non-lost frame is greater than 0 and less than the average frame energy, determining that the non-lost frame is a non-key voice frame; or if a frame energy of the non-lost frame is greater than the average frame energy, determining that the non-lost frame is a key voice frame.

With reference to the sixth possible implementation manner of the first aspect, in a seventh possible implementation manner, the determining a frame content characteristic of the frame loss part according to the frame content characteristic of the previous adjacent non-lost frame and the frame content characteristic of the subsequent adjacent non-lost frame includes: if both the previous adjacent non-lost frame and the subsequent adjacent non-lost frame are silence frames, determining that the frame loss part is a silence frame; if both the previous adjacent non-lost frame and the subsequent adjacent non-lost frame are key voice frames, determining that the frame loss part is a key voice frame; if both the previous adjacent non-lost frame and the subsequent adjacent non-lost frame are non-key voice frames, determining that the frame loss part is a non-key voice frame; if the previous adjacent non-lost frame is a key voice frame and the subsequent adjacent non-lost frame is a silence frame, determining that a first half of the frame loss part is a key voice frame and a second half of the frame loss part is a non-key voice frame; if the previous adjacent non-lost frame is a silence frame and the subsequent adjacent non-lost frame is a key voice frame, determining that a first half of the frame loss part is a non-key voice frame and a second half of the frame loss part is a key voice frame; if the previous adjacent non-lost frame is a key voice frame and the subsequent adjacent non-lost frame is a non-key voice frame, determining that the frame loss part is a key voice frame; if the previous adjacent non-lost frame is a non-key voice frame and the subsequent adjacent non-lost frame is a key voice frame, determining that the frame loss part is a key voice frame; if the previous adjacent non-lost frame is a non-key voice frame and the subsequent adjacent non-lost frame is a silence frame, determining that the frame loss part is a non-key voice frame; or if the previous adjacent non-lost frame is a silence frame and the subsequent adjacent non-lost frame is a non-key voice frame, determining that the frame loss part is a non-key voice frame.

With reference to the third, fourth, or seventh possible implementation manner of the first aspect, in an eighth possible implementation manner, the dividing the voice sequence into statements according to the determined frame content characteristic, and dividing the statements obtained by means of division into multiple frame loss events includes: when a quantity of consecutive silence frames exceeds a preset quantity of times, dividing a voice sequence prior to the silence frames into statements; and when a distance between two adjacent frame loss parts in the statements is less than or equal to a preset distance, determining the two adjacent frame loss parts as one frame loss event; or when a distance between two adjacent frame loss parts in the statements is greater than a preset distance, determining the two adjacent frame loss parts as two frame loss events.

With reference to the third, fourth, or seventh possible implementation manner of the first aspect, in a ninth possible implementation manner, the evaluating voice quality of each statement according to a preset voice quality evaluation model and according to the non-voice parameters to obtain the voice quality of each statement includes: performing distortion mapping on the frame loss event according to the preset voice quality evaluation model and according to the non-voice parameters to obtain a total quantity of lost voice frames; and calculating voice quality of the statement according to the total quantity of lost voice frames.

With reference to the ninth possible implementation manner of the first aspect, in a tenth possible implementation manner, the non-voice parameters include a distance between a non-key voice frame and a key voice frame, a quantity of times of voice frame loss, a voice frame length lost at a time, and an impairment length, and then the performing distortion mapping on the frame loss event according to the preset voice quality evaluation model and according to the non-voice parameters to obtain a total quantity of lost voice frames includes: when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping; when frames are lost discretely, mapping impaired frames in the frame loss event to a quantity of lost voice frames according to the quantity of times of voice frame loss, the voice frame length lost at a time, and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping; or when frames are lost discretely, mapping impaired frames in the frame loss event to a quantity of lost voice frames according to the voice frame length lost at a time and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping.

With reference to the ninth possible implementation manner of the first aspect, in an eleventh possible implementation manner, the non-voice parameters include a distance between a non-key voice frame and a key voice frame, a quantity of times of voice frame loss, an average loss length, and an average impairment length, and then the mapping lost frames in different locations in the frame loss event and lost frames of different discrete distributions to the total quantity of lost voice frames according to the non-voice parameters includes: when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping; or when frames are lost discretely, mapping the frame loss event to the total quantity of lost voice frames according to the average loss length and the average impairment length.

According to a second aspect, an embodiment of the present application further provides a voice quality evaluation apparatus, including an obtaining unit, a parse unit, a determining unit, a division unit, an extraction unit, and an evaluation unit, where the obtaining unit is configured to obtain a voice data packet, where the voice data packet includes a voice sequence; the parse unit is configured to parse the data packet obtained by the obtaining unit, so as to obtain a parse result; the determining unit is configured to determine a frame content characteristic of the data packet according to the parse result obtained by the parse unit, where the frame content characteristic includes a silence frame and a voice frame; the division unit is configured to divide the voice sequence into statements according to the frame content characteristic determined by the determining unit, and divide the statements obtained by means of division into multiple frame loss events; the extraction unit is configured to extract non-voice parameters according to the frame loss events obtained by the division unit by means of division, where the non-voice parameters include a location parameter and a discrete distribution parameter; and the evaluation unit is configured to evaluate voice quality of each statement according to a preset voice quality evaluation model and according to the non-voice parameters extracted by the extraction unit so as to obtain the voice quality of each statement, and evaluate voice quality of the voice sequence according to the voice quality of each statement.

With reference to the second aspect, in a first possible implementation manner, the parse unit is specifically configured to parse a packet header of the data packet to obtain a parse result, where the parse result includes duration of the voice sequence, a bit quantity of the voice sequence, a frame loss location, and voice load; and the determining unit is specifically configured to determine, in the data packet according to the frame loss location, a frame loss part that currently needs to be detected, determine a frame content characteristic of a previous adjacent non-lost frame and a frame content characteristic of a subsequent adjacent non-lost frame of the frame loss part separately according to the duration of the voice sequence, the bit quantity of the voice sequence, and the voice load, determine a mark of the subsequent adjacent non-lost frame, and determine a frame content characteristic of the frame loss part according to the frame content characteristic of the previous adjacent non-lost frame, the frame content characteristic of the subsequent adjacent non-lost frame, and the mark of the subsequent adjacent non-lost frame.

With reference to the first possible implementation manner of the second aspect, in a second possible implementation manner, the determining unit is specifically configured to obtain an actual valid payload length of a non-lost frame; determine a bit rate according to the voice load, the bit quantity of the voice sequence, and the duration of the voice sequence; and if a standard valid payload length corresponding to the bit rate is consistent with the actual valid payload length, determine that the non-lost frame is a voice frame; or if a standard valid payload length corresponding to the bit rate is inconsistent with the actual valid payload length, determine that the non-lost frame is a silence frame.

With reference to the second possible implementation manner of the second aspect, in a third possible implementation manner, the determining unit is specifically configured to: if both the previous adjacent non-lost frame and the subsequent adjacent non-lost frame are silence frames or the mark of the subsequent adjacent non-lost frame indicates that the subsequent adjacent non-lost frame is a first voice frame, determine that the frame loss part is a silence frame; otherwise, determine that the frame loss part is a voice frame.

With reference to the third possible implementation manner of the second aspect, in a fourth possible implementation manner, the voice frame includes a key voice frame and a non-key voice frame; and the determining unit is specifically configured to: when both the previous adjacent non-lost frame and the subsequent adjacent non-lost frame are voice frames, determine that the frame loss part is a key voice frame; when the previous adjacent non-lost frame is a voice frame and the subsequent adjacent non-lost frame is a silence frame, determine that a first half of the frame loss part is a key voice frame and a second half of the frame loss part is a non-key voice frame; or when the previous adjacent non-lost frame is a silence frame and the subsequent adjacent non-lost frame is a voice frame, determine that a first half of the frame loss part is a non-key voice frame and a second half of the frame loss part is a key voice frame.

With reference to the second aspect, in a fifth possible implementation manner, the parse unit is specifically configured to parse a packet header of the data packet to obtain a parse result, where the parse result includes duration of the voice sequence, a bit quantity of the voice sequence, a frame loss location, and voice load; perform AMR decoding according to the voice load to obtain an AMR-decoded voice signal; and calculate a frame energy and an average frame energy that are of each frame in the AMR-decoded voice signal according to the duration of the voice sequence and the bit quantity of the voice sequence; and the determining unit is specifically configured to determine, in the data packet according to the frame loss location, a frame loss part that currently needs to be detected, determine a frame content characteristic of a previous adjacent non-lost frame and a frame content characteristic of a subsequent adjacent non-lost frame of the frame loss part according to the calculated frame energy and average frame energy, and determine a frame content characteristic of the frame loss part according to the frame content characteristic of the previous adjacent non-lost frame and the frame content characteristic of the subsequent adjacent non-lost frame.

With reference to the fifth possible implementation manner of the second aspect, in a sixth possible implementation manner, the determining unit is specifically configured to: if a frame energy of the non-lost frame is less than or equal to 0, determine that the non-lost frame is a silence frame; if a frame energy of the non-lost frame is greater than 0 and less than the average frame energy, determine that the non-lost frame is a non-key voice frame; or if a frame energy of the non-lost frame is greater than the average frame energy, determine that the non-lost frame is a key voice frame.

With reference to the sixth possible implementation manner of the second aspect, in a seventh possible implementation manner, the determining unit is specifically configured to: if both the previous adjacent non-lost frame and the subsequent adjacent non-lost frame are silence frames, determine that the frame loss part is a silence frame; if both the previous adjacent non-lost frame and the subsequent adjacent non-lost frame are key voice frames, determine that the frame loss part is a key voice frame; if both the previous adjacent non-lost frame and the subsequent adjacent non-lost frame are non-key voice frames, determine that the frame loss part is a non-key voice frame; if the previous adjacent non-lost frame is a key voice frame and the subsequent adjacent non-lost frame is a silence frame, determine that a first half of the frame loss part is a key voice frame and a second half of the frame loss part is a non-key voice frame; if the previous adjacent non-lost frame is a silence frame and the subsequent adjacent non-lost frame is a key voice frame, determine that a first half of the frame loss part is a non-key voice frame and a second half of the frame loss part is a key voice frame; if the previous adjacent non-lost frame is a key voice frame and the subsequent adjacent non-lost frame is a non-key voice frame, determine that the frame loss part is a key voice frame; if the previous adjacent non-lost frame is a non-key voice frame and the subsequent adjacent non-lost frame is a key voice frame, determine that the frame loss part is a key voice frame; if the previous adjacent non-lost frame is a non-key voice frame and the subsequent adjacent non-lost frame is a silence frame, determine that the frame loss part is a non-key voice frame; or if the previous adjacent non-lost frame is a silence frame and the subsequent adjacent non-lost frame is a non-key voice frame, determine that the frame loss part is a non-key voice frame.

With reference to the third, fourth, or seventh possible implementation manner of the second aspect, in an eighth possible implementation manner, the division unit is specifically configured to: when a quantity of consecutive silence frames exceeds a preset quantity of times, divide a voice sequence prior to the silence frames into statements; and when a distance between two adjacent frame loss parts in the statements is less than or equal to a preset distance, determine the two adjacent frame loss parts as one frame loss event; or when a distance between two adjacent frame loss parts in the statements is greater than a preset distance, determine the two adjacent frame loss parts as two frame loss events.

With reference to the third, fourth, or seventh possible implementation manner of the second aspect, in a ninth possible implementation manner, the evaluation unit is specifically configured to: perform distortion mapping on the frame loss event according to the preset voice quality evaluation model and according to the non-voice parameters to obtain a total quantity of lost voice frames; and calculate voice quality of the statement according to the total quantity of lost voice frames.

With reference to the ninth possible implementation manner of the second aspect, in a tenth possible implementation manner, the non-voice parameters include a distance between a non-key voice frame and a key voice frame, a quantity of times of voice frame loss, a voice frame length lost at a time, and an impairment length, and then the evaluation unit is specifically configured to: when frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to the total quantity of lost voice frames according to the quantity of actually lost key voice frames and the quantity, of lost key voice frames, obtained by mapping; when frames are lost discretely, map impaired frames in the frame loss event to a quantity of lost voice frames according to the quantity of times of voice frame loss, the voice frame length lost at a time, and the impairment length, determine a quantity of actually lost key voice frames according to the quantity of times of voice frame loss, and map the frame loss event to the total quantity of lost voice frames according to the quantity of actually lost key voice frames and the quantity, of lost voice frames, obtained by mapping; or when frames are lost discretely, map impaired frames in the frame loss event to a quantity of lost voice frames according to the voice frame length lost at a time and the impairment length, determine a quantity of actually lost key voice frames according to the quantity of times of voice frame loss, and map the frame loss event to the total quantity of lost voice frames according to the quantity of actually lost key voice frames and the quantity, of lost voice frames, obtained by mapping.

With reference to the ninth possible implementation manner of the second aspect, in an eleventh possible implementation manner, the non-voice parameters include a distance between a non-key voice frame and a key voice frame, a quantity of times of voice frame loss, an average loss length, and an average impairment length, and then the evaluation unit is specifically configured to: when frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to the total quantity of lost voice frames according to the quantity of actually lost key voice frames and the quantity, of lost key voice frames, obtained by mapping; or when frames are lost discretely, map the frame loss event to the total quantity of lost voice frames according to the average loss length and the average impairment length.

According to a third aspect, an embodiment of the present application further provides a communications system, including any voice quality evaluation apparatus in the embodiments of the present application.

In the embodiments of the present application, an obtained voice data packet is parsed, and a frame content characteristic of the data packet is determined according to a parse result, for example, the frame content characteristic is a silence frame or a voice frame. Then, a voice sequence is divided into statements according to the determined frame content characteristic, and the statements are divided into multiple frame loss events; after non-voice parameters (including a location parameter and a discrete distribution parameter) are extracted according to the frame loss events, voice quality of each statement is evaluated according to a preset voice quality evaluation model and according to the non-voice parameters. Finally, voice quality of the entire voice sequence is evaluated according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

BRIEF DESCRIPTION OF DRAWINGS

To describe the technical solutions in the embodiments of the present application or more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. The described embodiments are merely some but not all of the embodiments of the present application. All other embodiments obtained by a person skilled in the art based on the embodiments of the present application without creative efforts shall fall within the protection scope of the present application.

The embodiments of the present application provide a voice quality evaluation method, apparatus, and system, which are separately elaborated below.

Embodiment 1

This embodiment is described from a perspective of a voice quality evaluation apparatus. The voice quality evaluation apparatus may be specifically integrated in a network-side device such as a server.

A voice quality evaluation method includes: obtaining a voice data packet, where the voice data packet includes a voice sequence; parsing the data packet to obtain a parse result; determining a frame content characteristic of the data packet according to the parse result; dividing the voice sequence into statements according to the determined frame content characteristic, and dividing the statements obtained by means of division into multiple frame loss events; extracting non-voice parameters according to the frame loss events; evaluating voice quality of each statement according to a preset voice quality evaluation model and according to the non-voice parameters to obtain the voice quality of each statement; and evaluating voice quality of the voice sequence according to the voice quality of each statement.

Figure 1A:
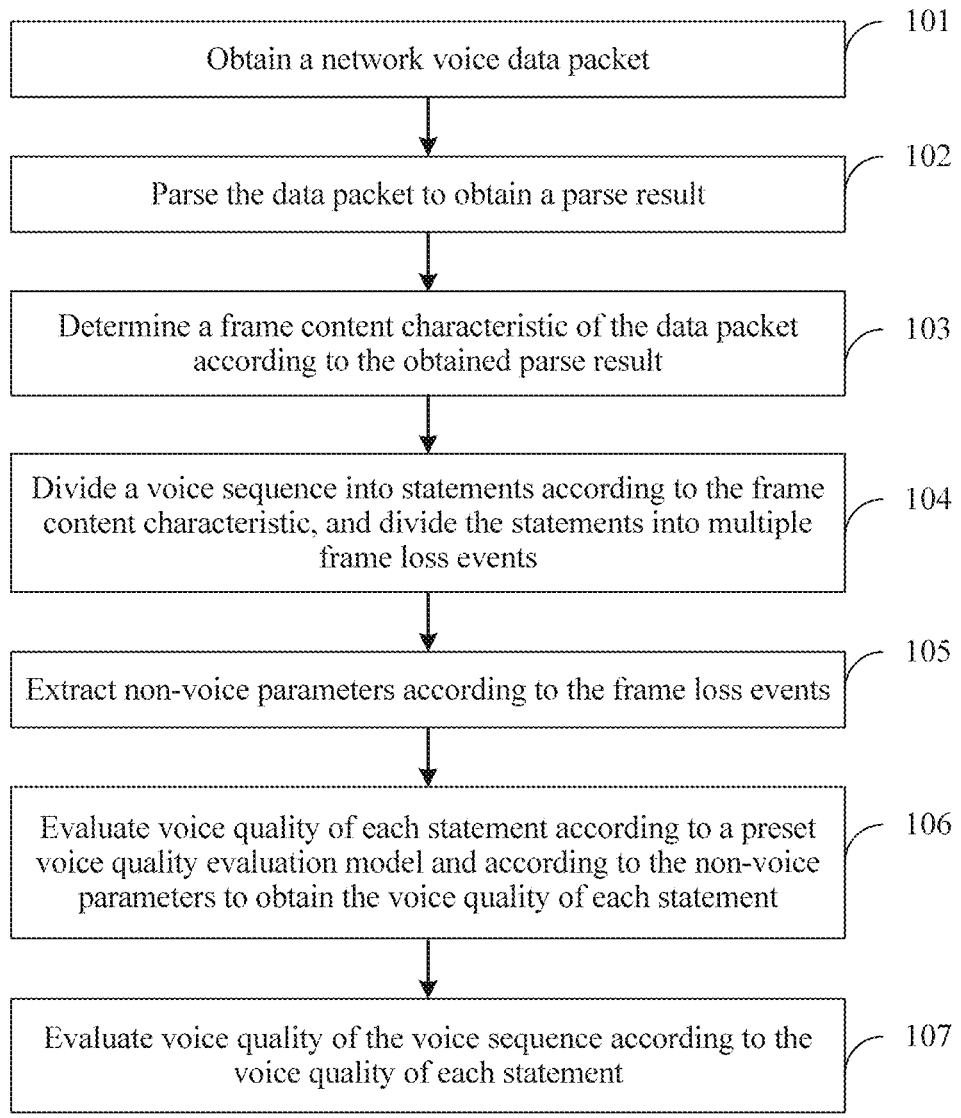
FIG. 1A is a flowchart of a voice quality evaluation method according to an embodiment of the present application.

As shown in FIG. 1a, a detailed process of the voice quality evaluation method may be as follows:

101. Obtain a voice data packet.

The voice data packet may include a packet header and a voice payload. The packet header may include a Real-time Transport Protocol (RTP) header, a User Datagram Protocol (UDP) header, an IP header, and the like, and the voice payload may include a voice sequence and the like.

102. Parse the obtained data packet to obtain a parse result.

Depending on a different voice quality evaluation model, a data packet parsing method differs. For example, using a packet layer model and a bit stream layer model as an example, the method may be specifically as follows:

(1) Packet Layer Model

Specifically, the packet header of the data packet may be parsed to obtain a parse result. The parse result may include duration of the voice sequence, a bit quantity of the voice sequence, a frame loss location, voice load, and the like. For example, using the $i^{th}$ data packet as an example, a method for obtaining the foregoing parameter may be specifically as follows:

Duration $Duration_i$ of a voice sequence included in the $i^{th}$ data packet is as follows:

$$Duration_i = Timestamp_{i+1} - Timestamp_i$$

where $Timestamp_i$ is a timestamp of the $i^{th}$ data packet, and $Timestamp_{i+1}$ is a timestamp of the $(i+1)^{th}$ data packet, which may be read from an RTP header of the data packet.

A bit quantity $B_i$ of the voice sequence included in the $i^{th}$ data packet is as follows:

$$B_i = LIP_i - HIP_i - HUDP_i - HRTP_i$$

where $LIP_i$ is a bit quantity of the $i^{th}$ data packet, and may be directly obtained from an IP header; $HIP_i$ is a length of the IP protocol header of the $i^{th}$ data packet, $HUDP_i$ is a length of a UDP header of the $i^{th}$ data packet, and $HRTP_i$ is a length of an RTP protocol header of the $i^{th}$ data packet.

Voice load and voice duration $Duration_{max}$ of the $i^{th}$ data packet are recorded, where the voice load refers to a bit quantity of RTP load when data packet load is maximal, and the bit quantity is denoted by $B_{max}$. It is generally deemed that the $i^{th}$ data packet is non-silence, and a non-silence bit rate of the $i^{th}$ data packet is:

$$R = \frac{B_{max}}{Duration_{max}}$$

In addition, a sequence number field in the RTP header denotes order of the data packet, and a location of a lost frame (that is, a frame loss location) and a quantity of lost frames can be determined according to an RTP sequence number of each data packet.

(2) Bit Stream Layer Model

Different from the packet layer model, the bit stream layer model not only needs to parse the packet header of the data packet, but also needs to parse the voice load part, which is described below:

A. Parse a packet header of the data packet to obtain a parse result, where the parse result may include information such as duration of the voice sequence, a bit quantity of the voice sequence, a frame loss location, and voice load. A specific obtaining method of the information is the same as that in the packet layer model, and is not described herein again.

B. Perform AMR decoding according to the voice load to obtain an AMR-decoded voice signal.

C. Calculate a frame energy and an average frame energy that are of each frame in the AMR-decoded voice signal according to the duration of the voice sequence and the bit quantity of the voice sequence.

The frame energy of each frame may be obtained by quantization according to auditory characteristics of human ears and subjective experience. If the frame energy is greater than 0, the frame is a voice frame, and an average energy of the voice frame is calculated accordingly to obtain the average frame energy.

103. Determine a frame content characteristic of the data packet according to the obtained parse result.

The frame content characteristic may include a silence frame and a voice frame. That is, in this step (step 103), frame content of the data packet may be detected to determine whether a frame is a voice frame or a silence frame. The voice frame may be further classified into a key voice frame and a non-key voice frame.

Because the parse results obtained according to different voice quality evaluation models are different, a method for determining the frame content characteristic of the data packet also differs. For example, still using the packet layer model and the bit stream layer model as an example, the method may be specifically as follows:

(1) Packet Layer Model

A. In the data packet, according to the frame loss location, determine a frame loss part that currently needs to be detected.

One frame loss part may include multiple consecutive lost frames.

B. Determine a frame content characteristic of a previous adjacent non-lost frame and a frame content characteristic of a subsequent adjacent non-lost frame of the frame loss part separately according to the duration of the voice sequence, the bit quantity of the voice sequence, and the voice load, and determine a mark of the subsequent adjacent non-lost frame, where the mark is a frame serial number.

The determining a frame content characteristic of a non-lost frame according to the duration of the voice sequence, the bit quantity of the voice sequence, and the voice load may specifically include: obtaining an actual valid payload length of the non-lost frame; determining a bit rate (that is, a coding rate) according to the voice load, the bit quantity of the voice sequence, and the duration of the voice sequence; and if a standard valid payload length corresponding to the bit rate is consistent with the actual valid payload length, determining that the non-lost frame is a voice frame; or if a standard valid payload length corresponding to the bit rate is inconsistent with the actual valid payload length, determining that the non-lost frame is a silence frame.

Specifically, a correspondence table may be set and used to record a correspondence between a bit rate and a standard valid payload length. In this way, a corresponding standard valid payload length can be obtained by looking up in the correspondence table according to a bit rate. For example, for details, reference may be made to Table 1.

TABLE 1

| Coding mode | Bit rate (kb/s) | Standard valid payload length (Byte) |
|---|---|---|
| AMR475 | 4.75 | 14 |
| AMR515 | 5.15 | 15 |
| AMR59 | 5.9 | 17 |
| AMR67 | 6.7 | 19 |
| AMR74 | 7.4 | 21 |
| AMR795 | 7.95 | 22 |
| AMR102 | 10.2 | 28 |
| AMR122 | 12.2 | 33 |
| ... | ... | ... |

According to Table 1, it can be learned that in an AMR475 coding mode, a standard valid payload length corresponding to a bit rate 4.75 kb/s is 14 bytes. Therefore, if the actual valid payload of the non-lost frame is 14 bytes, the frame is a voice frame; otherwise, if the actual valid payload of the non-lost frame is not 14 bytes, the frame is a silence frame; and so on.

C. Determine a frame content characteristic of the frame loss part according to the frame content characteristic of the previous adjacent non-lost frame, the frame content characteristic of the subsequent adjacent non-lost frame, and the mark of the subsequent adjacent non-lost frame, which, for example, may be specifically as follows:

If both the previous adjacent non-lost frame and the subsequent adjacent non-lost frame are silence frames or the mark of the subsequent adjacent non-lost frame indicates that the subsequent adjacent non-lost frame is a first voice frame (for example, the mark is 1), determine that the frame loss part is a silence frame; otherwise, determine that the frame loss part is a voice frame.

In addition, in order to further improve prediction precision, the voice frame may be further classified into a key voice frame and a non-key voice frame, so that different processing can be performed on the key voice frame and the non-key voice frame subsequently. The key voice frame refers to a frame that much affects the voice quality, and the non-key voice frame refers to a frame that little affects the voice quality.

If the voice frame is classified into a key voice frame and a non-key voice frame, the step "determining that the frame loss part is a voice frame" may specifically include the following cases: a. When both the previous adjacent non-lost frame and the subsequent adjacent non-lost frame are voice frames, determine that the frame loss part is a key voice frame; b. When the previous adjacent non-lost frame is a voice frame and the subsequent adjacent non-lost frame is a silence frame, determine that a first half of the frame loss part is a key voice frame and determine that a second half of the frame loss part is a non-key voice frame; or c. When the previous adjacent non-lost frame is a silence frame and the subsequent adjacent non-lost frame is a voice frame, determine that a first half of the frame loss part is a non-key voice frame and determine that a second half of the frame loss part is a key voice frame.

(2) Bit Stream Layer Model

Frame content detection in the bit stream layer model is more refined than that in the packet layer model. For example, the voice frame may include a key voice frame and a non-key voice frame.

For the bit stream layer model, the step "determining a frame content characteristic of the data packet according to the obtained parse result" may be specifically as follows:

A. In the data packet, according to the frame loss location, determine a frame loss part that currently needs to be detected.

One frame loss part may include multiple consecutive lost frames.

B. Determine a frame content characteristic of a previous adjacent non-lost frame and a frame content characteristic of a subsequent adjacent non-lost frame of the frame loss part according to the calculated frame energy and average frame energy.

The determining a frame content characteristic of a non-lost frame according to the calculated frame energy and average frame energy includes: if a frame energy of the non-lost frame is less than or equal to 0, determining that the non-lost frame is a silence frame; if a frame energy of the non-lost frame is greater than 0 and less than the average frame energy, determining that the non-lost frame is a non-key voice frame; or if a frame energy of the non-lost frame is greater than the average frame energy, determining that the non-lost frame is a key voice frame.

C. The determining a frame content characteristic of the frame loss part according to the frame content characteristic of the previous adjacent non-lost frame and the frame content characteristic of the subsequent adjacent non-lost frame may be specifically as follows: a. If both the previous adjacent non-lost frame and the subsequent adjacent non-lost frame are silence frames, determine that the frame loss part is a silence frame; b. If both the previous adjacent non-lost frame and the subsequent adjacent non-lost frame are key voice frames, determine that the frame loss part is a key voice frame; c. If both the previous adjacent non-lost frame and the subsequent adjacent non-lost frame are non-key voice frames, determine that the frame loss part is a non-key voice frame; d. If the previous adjacent non-lost frame is a key voice frame and the subsequent adjacent non-lost frame is a silence frame, determine that a first half of the frame loss part is a key voice frame and a second half of the frame loss part is a non-key voice frame; e. If the previous adjacent non-lost frame is a silence frame and the subsequent adjacent non-lost frame is a key voice frame, determine that a first half of the frame loss part is a non-key voice frame and a second half of the frame loss part is a key voice frame; f. If the previous adjacent non-lost frame is a key voice frame and the subsequent adjacent non-lost frame is a non-key voice frame, determine that the frame loss part is a key voice frame; g. If the previous adjacent non-lost frame is a non-key voice frame and the subsequent adjacent non-lost frame is a key voice frame, determine that the frame loss part is a key voice frame; h. If the previous adjacent non-lost frame is a non-key voice frame and the subsequent adjacent non-lost frame is a silence frame, determine that the frame loss part is a non-key voice frame; or i. If the previous adjacent non-lost frame is a silence frame and the subsequent adjacent non-lost frame is a non-key voice frame, determine that the frame loss part is a non-key voice frame.

Figure 1B:
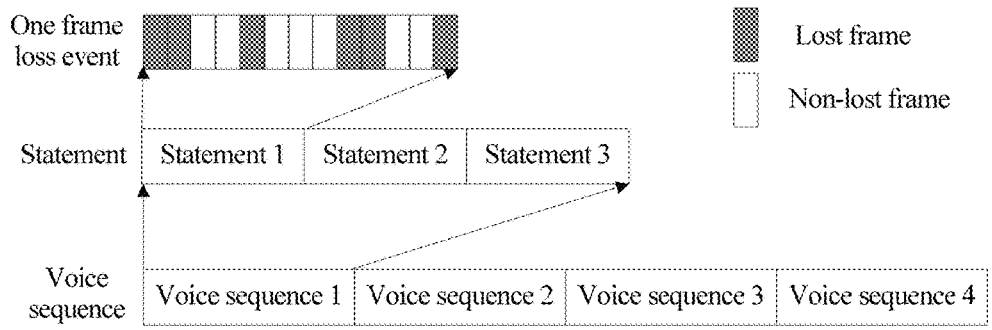
FIG. 1B is a schematic diagram of voice sequence division in a voice quality evaluation method according to an embodiment of the present application.

104. Divide the voice sequence into statements according to the determined frame content characteristic, and divide the statements obtained by means of division into multiple frame loss events. For details of a relationship between the voice sequence, the statement, and the frame loss event, reference may be made to FIG. 1b.

For example, statement division and frame loss event division may be specifically performed according to the following method:

(1) When a quantity of consecutive silence frames exceeds a preset quantity of times, divide a voice sequence prior to the silence frames into statements.

That is, when at least Ns consecutive silence frames appear, a voice sequence prior to the silence frames is divided into statements, where Ns may be set according to actual application requirements, for example, Ns may be set to 6.

(2) When a distance between two adjacent frame loss parts in the statements is less than or equal to a preset distance, determine the two adjacent frame loss parts as one frame loss event.

(3) When a distance between two adjacent frame loss parts in the statements is greater than a preset distance, determine the two adjacent frame loss parts as two frame loss events.

The preset quantity of times and the preset distance may be set according to actual application requirements. For example, the preset quantity of times may be set to 6, and the preset distance may be set to 10.

105. Extract non-voice parameters according to the frame loss events.

The non-voice parameters may include a location parameter and a discrete distribution parameter. Depending on a different subsequent method for evaluating voice quality, the non-voice parameters extracted in this case also differ. For example, the non-voice parameters may include a distance between a non-key voice frame and a key voice frame, a quantity of times of voice frame loss, a voice frame length lost at a time, and an impairment length; or, the non-voice parameters may include a distance between a non-key voice frame and a key voice frame, a quantity of times of voice frame loss, an average loss length, and an average impairment length. The following briefly describes the parameters:

Distance $L_j$ between a non-key voice frame and a key voice frame: according to auditory perception characteristics of human ears, a longer distance from a lost non-key voice frame to an adjacent key voice frame causes lower distortion.

Figure 1C:
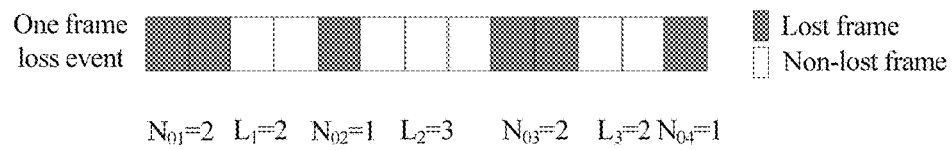
FIG. 1C is a schematic diagram of analyzing a frame loss event in a voice quality evaluation method according to an embodiment of the present application.

Quantity $N_1$ of times of voice frame loss: refers to a quantity of times of voice frame loss in a frame loss event, for example, a frame loss event shown in FIG. 1c, in which a quantity, of times of voice frame loss, $N_1=4$.

Voice frame length $N_{0k}$ lost at a time: refers to a quantity of consecutive voice frames lost on each occasion of frame loss, for example, in the frame loss event shown in FIG. 1c, $N_{01}=2$, $N_{02}=1$, $N_{03}=2$, and $N_{04}=1$.

Impairment length $L_k$: refers to a quantity of non-lost voice frames in two adjacent frame loss events, for example, in the frame loss event shown in FIG. 1c, $L_1=2$, $L_2=3$, and $L_3=2$.

Average loss length $N_0$ of a voice frame:

$$N_0 = \frac{\text{total loss length}}{\text{quantity of times of voice frame loss}}.$$

In the frame loss event shown in FIG. 1c, $N_0=6/4=1.5$.
Impairment length L:

$$L = \frac{\sum \text{impairment length}}{\text{quantity of times of voice frame loss} - 1}.$$

In the frame loss event shown in FIG. 1c, $L=(L_1+L_2+L_3)/N_1=7/3$.

106. Evaluate voice quality of each statement according to a preset voice quality evaluation model and according to the non-voice parameters to obtain the voice quality of each statement, which, for example, may be specifically as follows:

Perform distortion mapping on the frame loss event according to the preset voice quality evaluation model and according to the non-voice parameters to obtain a total quantity of lost voice frames; and calculate voice quality of the statement according to the total quantity of lost voice frames.

The step "performing distortion mapping on the frame loss event according to the preset voice quality evaluation model and according to the non-voice parameters to obtain a total quantity of lost voice frames" may be specifically implemented in any of the following manners:

(1) The First Manner

The non-voice parameters may include a location parameter, a discrete distribution parameter, and the like. The non-voice parameters may include a distance between a non-key voice frame and a key voice frame, a quantity of times of voice frame loss, a voice frame length lost at a time, and an impairment length, and then in this case, the step "performing distortion mapping on the frame loss event according to the preset voice quality evaluation model and according to the non-voice parameters to obtain a total quantity of lost voice frames" may include:

A. In a case of losing frames consecutively when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping, which is described below:

The mapping the non-key voice frame to the quantity of lost key voice frames may be denoted by the following formula:

$FLN_{i,j}=f(L_j)$

For example, specifically, $FLN_{i,j}=\exp(-0.033*L_j)$ where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a case of losing frames discretely when frames are lost discretely, mapping impaired frames in the frame loss event to a quantity of lost voice frames according to the quantity of times of voice frame loss, the voice frame length lost at a time, and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$FLN_{i,k}=f(N_1,N_{0k},L_k)$

For example, specifically, $$\begin{cases} V_k = a_1 * N_{0k}^2 + b_1 * N_{0k} + c_1 \\ A_{0k} = a_2 * \exp\left[-\left(\frac{V_k * N_1 - b_2}{c_2}\right)^2\right] \\ FLN_{i,k} = A_{0k} * \{a_3 * \exp[-b_3 * (L_k - 1)] + c_3\} \end{cases}$$

where $N_{0k}$ is a voice frame length lost at a time, $A_{0k}$ is impairment impact caused by the quantity of times of voice frame loss and a length lost at a time onto a single non-lost voice frame, $L_k$ is an impairment length when the frame loss event occurs for the $k^{th}$ time, and $FLN_{i,k}$ is a quantity, of voice frames, to which a single frame in $L_k$ impaired voice frames in the $i^{th}$ frame loss event is mapped, where parameters a1, b1, c1, a2, b2, c2, a3, b3, and c3 may be obtained by training.

The mapping the frame loss event to the total quantity of lost voice frames may be:

$$FLN_i = n_i + \sum_k (k * FLN_{i,k}).$$

$FLN_i$ is the total quantity, of lost voice frames (that is, the total quantity of lost voice frames), obtained by mapping the frame loss event, and $n_i$ denotes a quantity of actually lost key voice frames.

(2) The Second Manner

The non-voice parameters may include a location parameter, a discrete distribution parameter, and the like. The non-voice parameters include a distance between a non-key voice frame and a key voice frame, a quantity of times of voice frame loss, a voice frame length lost at a time, and an impairment length, and then the performing distortion mapping on the frame loss event according to the preset voice quality evaluation model and according to the non-voice parameters to obtain a total quantity of lost voice frames includes:

A. In a case of losing frames consecutively when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a case of losing frames discretely when frames are lost discretely, mapping impaired frames in the frame loss event to a quantity of lost voice frames according to the voice frame length lost at a time and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$FLN_{i,k} = f(N_{0k}, L_k)$

For example, specifically, $$\begin{cases} A_{0k} = a_1 * N_{0k}^2 + b_1 * N_{0k} + c_1 \\ FLN_{i,k} = A_{0k} * \{a_2 * \exp[-b_2 * L_k] + c_2\} \end{cases}$$

where $FLN_{i,k}$ is a quantity, of voice frames, to which $L_k$ impaired voice frames in the $i^{th}$ frame loss event are mapped, $A_{0k}$ is impairment impact caused by a length lost at a time in the frame loss event onto a single non-lost voice frame, and parameters $a_1$, $b_1$, $c_1$, $a_2$, $b_2$, and $c_2$ may be obtained by training.

The mapping the frame loss event to the total quantity of lost voice frames may be:

$$FLN_i = n_i + \sum_k FLN_{i,k}.$$

$FLN_i$ is the total quantity, of lost voice frames (that is, the total quantity of lost voice frames), obtained by mapping the frame loss event, and $n_i$ denotes a quantity of actually lost key voice frames.

(3) The Third Manner

Different from the first and second manners, the third manner does not calculate distortion of a single frame, but directly calculates distortion of the entire frame loss event.

The non-voice parameters may include a location parameter, a discrete distribution parameter, and the like. The non-voice parameters may include a distance between a non-key voice frame and a key voice frame, a quantity of times of voice frame loss, an average loss length, and an average impairment length, and then the mapping lost frames in different locations in the frame loss event and lost frames of different discrete distributions to the total quantity of lost voice frames according to the non-voice parameters may specifically include:

A. In a case of losing frames consecutively when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a case of losing frames discretely when frames are lost discretely, mapping the frame loss event to the total quantity of lost voice frames according to the average loss length and the average impairment length, which may be denoted by the following formula:

$$\begin{cases} V_1 = a_1 * \exp(b_1 * N_0) + c_1 \\ V_2 = a_2 * \exp(-b_2 * L) \\ FLN_i = a_3 * (V_1 * V_2 * N_3) + b_3 \end{cases}$$

where $FLN_i$ is the total quantity, of lost voice frames, to which the frame loss event is mapped, No is an average loss length of the voice frames, L is an impairment length, and parameters $a_1$, $b_1$, $c_1$, $a_2$, $b_2$, $a_3$, and $b_3$ may be obtained by training.

After the total quantity of lost voice frames is obtained, the voice quality of the statement can be calculated according to the total quantity of lost voice frames, which is described below:

A quantity of lost voice frames of a statement is:

$$FLN=f(FLN_1, FLN_2, \ldots, FLN_M)$$

where M is a quantity of frame loss events in each statement, and $FLN_i$ is a total quantity, of lost voice frames, obtained by mapping each frame loss event.

Statement quality $MOS_0$ without considering data packet loss is:

$$MOS_0=f(R).$$

Therefore, statement quality $Q_n$ with data packet loss considered may be:

$$Q_n=f(MOS_0, FLN).$$

If a match data table between R and $MOS_0$ is established by means of subjective experiments, $MOS_0$ can be obtained directly by looking up in the table during quality evaluation.

107. Evaluate voice quality of the voice sequence according to the voice quality of each statement, that is, synthesize the voice quality of each statement in the voice sequence to obtain the voice quality Q of the voice sequence, which is described below:

$$Q=f(Q_1, Q_2, \ldots, Q_N)$$

where $Q_n$ is statement quality with data packet loss considered, and N is a quantity of statements in the voice sequence.

It can be seen from the foregoing that in this embodiment, an obtained voice data packet is parsed, and a frame content characteristic of the data packet is determined according to a parse result, for example, the frame content characteristic is a silence frame and a voice frame. Then, a voice sequence is divided into statements according to the determined frame content characteristic, and the statements are divided into multiple frame loss events; after non-voice parameters (including a location parameter and a discrete distribution parameter) are extracted according to the frame loss events, voice quality of each statement is evaluated according to a preset voice quality evaluation model and according to the non-voice parameters. Finally, voice quality of the entire voice sequence is evaluated according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

According to the method described in Embodiment 1, more detailed description is given in Embodiments 2, 3, 4, and 5 below.

Embodiment 2

This embodiment is described by using a packet layer model as an example.

Figure 2A:
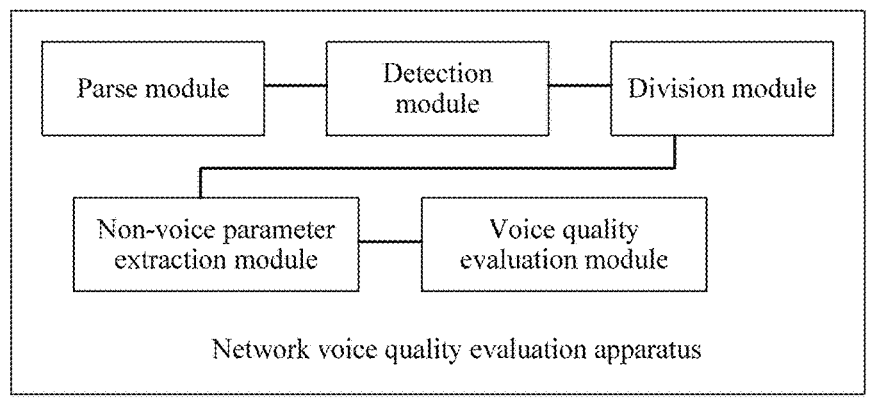
FIG. 2A is a schematic structural diagram of a voice quality evaluation apparatus according to an embodiment of the present application.

As shown in FIG. 2a, the voice quality evaluation apparatus may include a parse module, a detection module, a division module, a non-voice parameter extraction module, and a voice quality evaluation module, where functions of each module may be specifically as follows:

(1) Parse Module

The parse module is configured to obtain a voice data packet, and parse the obtained data packet to obtain a parse result, where the parse result may include duration of a voice sequence, a bit quantity of the voice sequence, a frame loss location, voice load, and the like.

(2) Detection Module

Impact caused by frame loss onto voice quality is closely related to frame loss content. When the frame loss content is a silence frame, a voice quality impairment extent is relatively small; and when the frame loss content is a voice frame, important voice information will be lost, and impact on the voice quality is relatively large. Therefore, in evaluating the voice quality, the frame loss content needs to be detected. Therefore, the detection module is primarily configured to determine a frame content characteristic of the data packet according to the obtained parse result, that is, determine whether each data frame is a silence frame or a voice frame. For example, specifically, a frame content characteristic of a non-lost frame may be analyzed, and then according to a short-term correlation of a voice signal, a frame content characteristic of a current lost frame is determined by using a frame content characteristic of an adjacent non-lost frame.

Figure 2B:
FIG. 2B is an exemplary diagram of a word pronunciation zone according to an embodiment of the present application.

In addition, when frame loss occurs in a different location of a word/Chinese character, impact is different. As shown in FIG. 2b, A denotes a middle zone (or referred to as a key zone) of a word, B and C respectively denote a beginning and an end (collectively referred to as a non-key zone) of the word, and D denotes a silent zone. According to auditory perception characteristics of human ears, a longer distance from a frame loss location in an adjacent non-key zone to zone A causes lower distortion. Therefore, on a basis of frame content detection, the detection module may make a further judgment on the lost frame to determine whether the current lost frame is a key voice frame or a non-key voice frame.

(3) Division Module

The division module is configured to divide the voice sequence into statements according to the determined frame content characteristic, and divide the statements obtained by means of division into multiple frame loss events.

(4) Non-Voice Parameter Extraction Module

The non-voice parameter extraction module is configured to extract non-voice parameters according to the frame loss events. The non-voice parameters may include a location parameter and a discrete distribution parameter.

(5) Voice Quality Evaluation Module

The voice quality evaluation module is configured to evaluate voice quality of each statement according to a preset voice quality evaluation model and according to the non-voice parameters to obtain the voice quality of each statement, and then evaluate voice quality of the voice sequence according to the voice quality of each statement.

Figure 2C:
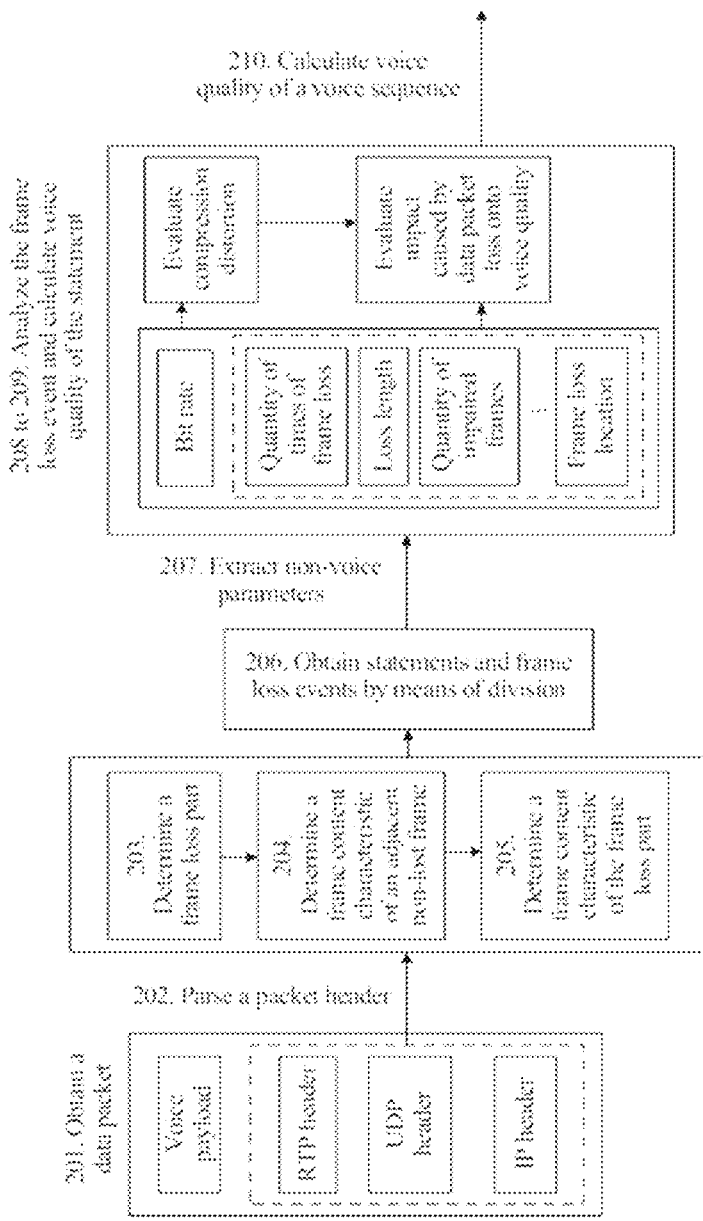
FIG. 2C is another flowchart of a voice quality evaluation method according to an embodiment of the present application.

As shown in FIG. 2c, a detailed process of a voice quality evaluation method may be as follows:

201. A parse module obtains a voice data packet.

The voice data packet may include a packet header and a voice payload. The packet header may include an RTP header, a UDP header, an IP header, and the like, and the voice payload may include a voice sequence and the like.

202. The parse module parses a packet header of the data packet to obtain a parse result. The parse result may include duration of a voice sequence, a bit quantity of the voice sequence, a frame loss location, voice load, and the like.

For example, using the $i^{th}$ data packet as an example, a method for obtaining the foregoing parameter may be specifically as follows:

Duration $Duration_i$ of a voice sequence included in the $i^{th}$ data packet is as follows:

$$Duration_i = Timestamp_{i+1} - Timestamp_i$$

where $Timestamp_i$ is a timestamp of the $i^{th}$ data packet, and $Timestamp_{i+1}$ is a timestamp of the $(i+1)^{th}$ data packet, which may be read from an RTP header of the data packet.

A bit quantity $B_i$ of the voice sequence included in the $i^{th}$ data packet is as follows:

$$B_i = LIP_i - HIP_i - HUDP_i - HRTP_i$$

where $LIP_i$ is a bit quantity of the $i^{th}$ data packet, and may be directly obtained from an IP header; $HIP_i$ is a length of the IP protocol header of the $i^{th}$ data packet, $HUDP_i$ is a length of a UDP protocol header of the $i^{th}$ data packet, and $HRTP_i$ is a length of an RTP protocol header of the $i^{th}$ data packet.

Voice load and voice duration $Duration_{max}$ of the $i^{th}$ data packet are recorded, where the voice load refers to a bit quantity of RTP load when data packet load is maximal, and the bit quantity is denoted by $B_{max}$. It is generally deemed that the $i^{th}$ data packet is non-silence, and a non-silence bit rate of the $i^{th}$ data packet is:

$$R = \frac{B_{max}}{Duration_{max}}.$$

In addition, a sequence number field in the RTP header denotes order of the data packet, and a location of a lost frame (that is, a frame loss location) and a quantity of lost frames can be determined according to an RTP sequence number of each data packet.

203. According to the frame loss location, a detection module determines, in the data packet, a frame loss part that currently needs to be detected.

One frame loss part may include multiple consecutive lost frames.

204. The detection module determines a frame content characteristic of a previous adjacent non-lost frame and a frame content characteristic of a subsequent adjacent non-lost frame of the frame loss part separately according to the duration of the voice sequence, the bit quantity of the voice sequence, and the voice load, and determines a mark of the subsequent adjacent non-lost frame.

For example, if current lost frames are the $n^{th}$ frame to the $(n+m-1)^{th}$ frame (that is, the frame loss part is the $n^{th}$ frame to the $(n+m-1)^{th}$ frame), the previous adjacent non-lost frame is the $(n-1)^{th}$ frame, and the subsequent adjacent non-lost frame is the $(n+m)^{th}$ frame. In this case, the detection module may determine a frame content characteristic of the $(n-1)^{th}$ frame and a frame content characteristic of the $(n+m)^{th}$ frame separately according to the duration of the voice sequence, the quantity of bits of the voice sequence, and the voice load, and determine a mark of the $(n+m)^{th}$ frame.

The frame content characteristic may include a silence frame and a voice frame, and then the determining a frame content characteristic of a non-lost frame according to the duration of the voice sequence, the bit quantity of the voice sequence, and the voice load may specifically include: obtaining an actual valid payload length of the non-lost frame; determining a bit rate (that is, a coding rate) according to the voice load, the bit quantity of the voice sequence, and the duration of the voice sequence; and if a standard valid payload length corresponding to the bit rate is consistent with the actual valid payload length, determining that the non-lost frame is a voice frame; or if a standard valid payload length corresponding to the bit rate is inconsistent with the actual valid payload length, determining that the non-lost frame is a silence frame.

Specifically, a correspondence table may be set and used to record a correspondence between a bit rate and a standard valid payload length. In this way, a corresponding standard valid payload length can be obtained by looking up in the correspondence table according to a bit rate. For example, for details, reference may be made to Table 1.

205. The detection module determines a frame content characteristic of the frame loss part according to the frame content characteristic of the previous adjacent non-lost frame, the frame content characteristic of the subsequent adjacent non-lost frame, and the mark of the subsequent adjacent non-lost frame.

For example, if current lost frames are the $n^{th}$ frame to the $(n+m-1)^{th}$ frame (that is, the frame loss part is the $n^{th}$ frame to the $(n+m-1)^{th}$ frame), the previous adjacent non-lost frame is the $(n-1)^{th}$ frame, and the subsequent adjacent non-lost frame is the $(n+m)^{th}$ frame. In this case, a detailed step may be as follows:

If both the $(n-1)^{th}$ frame and the $(n+m)^{th}$ frame are silence frames or a mark of the $(n+m)^{th}$ frame indicates that the $(n+m)^{th}$ frame is a first voice frame (for example, the mark is 1), determine that the frame loss part is a silence frame; otherwise, determine that the frame loss part is a voice frame.

In addition, in order to further improve prediction precision, the voice frame may be further classified into a key voice frame and a non-key voice frame. If the voice frame is classified into a key voice frame and a non-key voice frame, the step "determining that the frame loss part is a voice frame" may specifically include the following cases: a. When both the $(n-1)^{th}$ frame and the $(n+m)^{th}$ frame are voice frames, determine that the frame loss part is a key voice frame; b. When the $(n-1)^{th}$ frame is a voice frame and the $(n+m)^{th}$ frame is a silence frame, determine that a first half of the frame loss part is a key voice frame and determine that a second half of the frame loss part is a non-key voice frame; or c. When the $(n-1)^{th}$ frame is a silence frame and the $(n+m)^{th}$ frame is a voice frame, determine that a first half of the frame loss part is a non-key voice frame and determine that a second half of the frame loss part is a key voice frame.

206. A division unit divides the voice sequence into statements according to the determined frame content characteristic, and divides the statements obtained by means of division into multiple frame loss events.

For example, statement division and frame loss event division may be specifically performed according to the following method:

(1) When a quantity of consecutive silence frames exceeds a preset quantity of times, divide a voice sequence prior to the silence frames into statements.

That is, when at least Ns consecutive silence frames appear, a voice sequence prior to the silence frames is divided into statements, where Ns may be set according to actual application requirements, for example, Ns may be set to 6.

(2) When a distance between two adjacent frame loss parts in the statements is less than or equal to a preset distance, determine the two adjacent frame loss parts as one frame loss event.

(3) When a distance between two adjacent frame loss parts in the statements is greater than a preset distance, determine the two adjacent frame loss parts as two frame loss events.

The preset quantity of times and the preset distance may be set according to actual application requirements. For example, the preset quantity of times may be set to 6, and the preset distance may be set to 10.

207. A non-voice parameter extraction module extracts non-voice parameters according to the frame loss events.

The non-voice parameters may include a location parameter and a discrete distribution parameter, and the non-voice parameters may include a distance between a non-key voice frame and a key voice frame, a quantity of times of voice frame loss, a voice frame length lost at a time, an impairment length, and the like, which are described below:

Distance $L_j$ between a non-key voice frame and a key voice frame: according to auditory perception characteristics of human ears, a longer distance from a lost non-key voice frame to an adjacent key voice frame causes lower distortion.

Quantity $N_1$ of times of voice frame loss: refers to a quantity of times of voice frame loss in a frame loss event.

Voice frame length $N_{0k}$ lost at a time: refers to a quantity of consecutive voice frames lost on each occasion of frame loss.

Impairment length $L_k$: refers to a quantity of non-lost voice frames in two adjacent frame loss events.

Average loss length $N_0$ of a voice frame:

$$N_0 = \frac{\text{total loss length}}{\text{quantity of times of voice frame loss}}$$

Impairment length L:

$$L = \frac{\sum \text{impairment length}}{\text{quantity of times of voice frame loss} - 1}.$$

208. A voice quality evaluation module performs distortion mapping on the frame loss event according to a preset voice quality evaluation model and according to the obtained non-voice parameters to obtain a total quantity of lost voice frames, which, for example, may be specifically as follows:

A. In a Case of Losing Frames Consecutively

When frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to the total quantity of lost voice frames according to the quantity of actually lost key voice frames and the quantity, of lost key voice frames, obtained by mapping, which is described below:

The mapping the non-key voice frame to the quantity of lost key voice frames may be denoted by the following formula:

$$FLN_{i,j} = f(L_j)$$

For example, specifically, $$FLN_{i,j} = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely

When frames are lost discretely, map impaired frames in the frame loss event to a quantity of lost voice frames according to the quantity of times of voice frame loss, the voice frame length lost at a time, and the impairment length, determine a quantity of actually lost key voice frames according to the quantity of times of voice frame loss, and map the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$FLN_{i,k} = f(N_1, N_{0k}, L_k)$$

For example, specifically, $$\begin{cases} V_k = a_1 * N_{0k}^2 + b_1 * N_{0k} + c_1 \\ A_{0k} = a_2 * \exp\left[-\left(\frac{V_k * N_1 - b_2}{c_2}\right)^2\right] \\ FLN_{i,k} = A_{0k} * \{a_3 * \exp[-b_3 * (L_k - 1)] + c_3\} \end{cases}$$

where $N_{0k}$ is a voice frame length lost at a time, $A_{0k}$ is impairment impact caused by the quantity of times of voice frame loss and a length lost at a time onto a single non-lost voice frame, $L_k$ is an impairment length when the frame loss event occurs for the $k^{th}$ time, and $FLN_{i,k}$ is a quantity, of voice frames, to which a single frame in $L_k$ impaired voice frames in the $i^{th}$ frame loss event is mapped, where parameters $a_1$, $b_1$, $c_1$, $a_2$, $b_2$, $c_2$, $a_3$, $b_3$, and $c_3$ may be obtained by training.

The mapping the frame loss event to the total quantity of lost voice frames may be:

$$FLN_i = n_i + \sum_k (k * FLN_{i,k})$$

$FLN_i$ is the total quantity, of lost voice frames (that is, the total quantity of lost voice frames), obtained by mapping the frame loss event, and $n_i$ denotes a quantity of actually lost key voice frames.

209. The voice quality evaluation module calculates voice quality of the statement according to the total quantity of lost voice frames, which is as follows:

A quantity of lost voice frames of a statement is:

$$FLN = f(FLN_1, FLN_2, \ldots, FLN_M)$$

where M is a quantity of frame loss events in each statement, and $FLN_i$ is a total quantity, of lost voice frames, obtained by mapping each frame loss event. For example, the function may be specifically as follows:

$$FLN = \left(\sum_i^M (FLN_i)^p\right)^{\frac{1}{p}}.$$

Statement quality $MOS_0$ without considering data packet loss (that is, statement compression distortion) is:

$$MOS_0 = f(R).$$

Therefore, statement quality $Q_n$ with data packet loss considered may be:

$$Q_n = f(MOS_0, FLN).$$

For example, the function may be specifically as follows:

$$\begin{cases} D = 1 - \dfrac{a}{a + FLN^b} \\ Q_n = 1 + (MOS_0 - 1) * (1 - D) \end{cases}$$

where D is statement distortion, $MOS_0$ is the statement quality without considering data packet loss (that is, statement compression distortion), $Q_n$ is the statement quality with data packet loss considered, a and b are fixed parameters of the model, and a and b may be obtained by training.

If a match data table between a bit rate R (that is, a coding rate) and $MOS_0$ is established by means of subjective experiments, $MOS_0$ can be obtained directly by looking up in the table during quality evaluation. For example, for details, reference may be made to Table 2.

TABLE 2

| Bit rate (kb/s) | $MOS_0$ |
|---|---|
| 4.75 | 3.465 |
| 5.15 | 3.502 |
| 5.9 | 3.563 |
| 6.7 | 3.631 |
| 7.4 | 3.725 |
| 7.95 | 3.836 |
| 10.2 | 3.964 |
| 12.2 | 4.086 |
| ... | ... |

For example, by looking up in Table 2, it can be learned that $MOS_0$ corresponding to a bit rate 4.75 kilobytes per second (kb/s) is 3.465, $MOS_0$ corresponding to a bit rate 5.15 kb/s is 3.502, and so on.

210. The voice quality evaluation module evaluates voice quality of the voice sequence according to voice quality of each statement, that is, synthesizes the voice quality of each statement in the voice sequence to obtain the voice quality Q of the voice sequence, which is described below:

$$Q = f(Q_1, Q_2, \ldots, Q_N)$$

where $Q_n$ is statement quality with data packet loss considered, and N is a quantity of statements in the voice sequence. For example, the function may be specifically as follows:

$$Q = \min_{n \in N}(Q_n)$$

where Q is the voice quality of the voice sequence, $Q_n$ is the statement quality with data packet loss considered, and N is the quantity of statements in the voice sequence.

It can be learned from the foregoing that in this embodiment, an obtained voice data packet is parsed in a packet layer model-based manner, and a frame content characteristic of the data packet is determined according to a parse result, for example, the frame content characteristic is a silence frame and a voice frame. Then, a voice sequence is divided into statements according to the determined frame content characteristic, and the statements are divided into multiple frame loss events; after non-voice parameters (including a location parameter and a discrete distribution parameter) are extracted according to the frame loss events, voice quality of each statement is evaluated according to a preset voice quality evaluation model and according to the non-voice parameters. Finally, voice quality of the entire voice sequence is evaluated according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

Embodiment 3

This embodiment is described by using a bit stream layer model as an example.

A voice quality evaluation apparatus used in this embodiment is the same as that in Embodiment 2. For details, refer to FIG. 2a and the description in Embodiment 2. This embodiment differs from Embodiment 2 mainly in data packet parsing and frame content characteristic detection, which is elaborated below.

Figure 3:
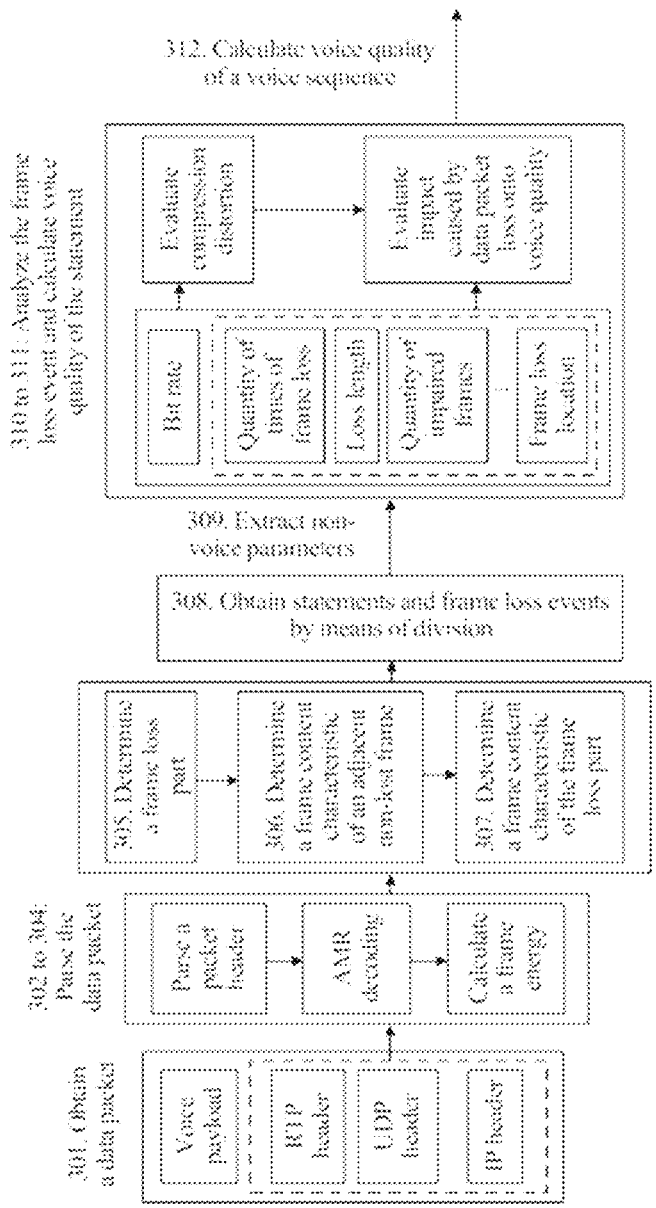
FIG. 3 is still another flowchart of a voice quality evaluation method according to an embodiment of the present application.

As shown in FIG. 3, a detailed process of a voice quality evaluation method may be as follows:

301. A parse module obtains a voice data packet.

The voice data packet may include a packet header and a voice payload. The packet header may include an RTP header, a UDP header, an IP header, and the like, and the voice payload may include a voice sequence and the like.

302. The parse module parses a packet header of the data packet to obtain a parse result. The parse result may include duration of a voice sequence, a bit quantity of the voice sequence, a frame loss location, voice load, and the like.

For example, using the $i^{th}$ data packet as an example, a method for obtaining the foregoing parameter may be specifically as follows:

Duration $Duration_i$ of a voice sequence included in the $i^{th}$ data packet is as follows:

$$Duration_i = Timestamp_{i+1} - Timestamp_i$$

where $Timestamp_i$ is a timestamp of the $i^{th}$ data packet, and $Timestamp_{i+1}$ is a timestamp of the $(i+1)^{th}$ data packet, which may be read from an RTP header of the data packet.

A bit quantity $B_i$ of the voice sequence included in the $i^{th}$ data packet is as follows:

$$B_i = LIP_i - HIP_i - HUDP_i - HRTP_i$$

where $LIP_i$ is a bit quantity of the $i^{th}$ data packet, and may be directly obtained from an IP header; $HIP_i$ is a length of the IP protocol header of the $i^{th}$ data packet, $HUDP_i$ is a length of a UDP protocol header of the $i^{th}$ data packet, and $HRTP_i$ is a length of an RTP protocol header of the $i^{th}$ data packet.

Voice load and voice duration $Duration_{max}$ of the $i^{th}$ data packet are recorded, where the voice load refers to a bit quantity of RTP load when data packet load is maximal, and the bit quantity is denoted by $B_{max}$. It is generally deemed that the $i^{th}$ data packet is non-silence, and a non-silence bit rate of the $i^{th}$ data packet is:

$$R = \frac{B_{max}}{Duration_{max}}$$

In addition, a sequence number field in the RTP header denotes order of the data packet, and a location of a lost frame (that is, a frame loss location) and a quantity of lost frames can be determined according to an RTP sequence number of each data packet.

303. The parse module performs AMR decoding according to the voice load to obtain an AMR-decoded voice signal.

304. The parse module calculates a frame energy and an average frame energy that are of each frame in the AMR-decoded voice signal according to the duration of the voice sequence and the bit quantity of the voice sequence.

The frame energy of each frame may be obtained by quantization according to auditory characteristics of human ears and subjective experience. If the frame energy is greater than 0, the frame is a voice frame, and an average energy of the voice frame is calculated accordingly to obtain the average frame energy.

305. According to the frame loss location, a detection module determines, in the data packet, a frame loss part that currently needs to be detected.

One frame loss part may include multiple consecutive lost frames.

306. The detection module determines a frame content characteristic of a previous adjacent non-lost frame and a frame content characteristic of a subsequent adjacent non-lost frame of the frame loss part according to the calculated frame energy and average frame energy.

For example, if current lost frames are the $n^{th}$ frame to the $(n+m-1)^{th}$ frame (that is, the frame loss part is the $n^{th}$ frame to the $(n+m-1)^{th}$ frame), the previous adjacent non-lost frame is the $(n-1)^{th}$ frame, and the subsequent adjacent non-lost frame is the $(n+m)^{th}$ frame. In this case, the detection module may determine a frame content characteristic of the $(n-1)^{th}$ frame and a frame content characteristic of the $(n+m)^{th}$ frame separately according to the duration of the voice sequence, the bit quantity of the voice sequence, and the voice load.

The frame content characteristic may include a silence frame and a voice frame, and then the determining a frame content characteristic of a non-lost frame according to the calculated frame energy and average frame energy includes: if a frame energy of the non-lost frame is less than or equal to 0, determining that the non-lost frame is a silence frame; if a frame energy of the non-lost frame is greater than 0 and less than the average frame energy, determining that the non-lost frame is a non-key voice frame; or if a frame energy of the non-lost frame is greater than the average frame energy, determining that the non-lost frame is a key voice frame.

307. The detection module determines a frame content characteristic of the frame loss part according to the frame content characteristic of the previous adjacent non-lost frame and the frame content characteristic of the subsequent adjacent non-lost frame, which may be specifically as follows:

For example, if current lost frames are the $n^{th}$ frame to the $(n+m-1)^{th}$ frame (that is, the frame loss part is the $n^{th}$ frame to the $(n+m-1)^{th}$ frame), the previous adjacent non-lost frame is the $(n-1)^{th}$ frame, and the subsequent adjacent non-lost frame is the $(n+m)^{th}$ frame. In this case, a detailed step may be as follows: a. If both the $(n-1)^{th}$ frame and the $(n+m)^{th}$ frame are silence frames, determine that the frame loss part is a silence frame; b. If both the $(n-1)^{th}$ frame and the $(n+m)^{th}$ frame are key voice frames, determine that the frame loss part is a key voice frame; c. If both the $(n-1)^{th}$ frame and the $(n+m)^{th}$ frame are non-key voice frames, determine that the frame loss part is a non-key voice frame; d. If the $(n-1)^{th}$ frame is a key voice frame and the $(n+m)^{th}$ frame is a silence frame, determine that a first half of the frame loss part is a key voice frame and a second half of the frame loss part is a non-key voice frame; e. If the $(n-1)^{th}$ frame is a silence frame and the $(n+m)^{th}$ frame is a key voice frame, determine that a first half of the frame loss part is a non-key voice frame and a second half of the frame loss part is a key voice frame; f. If the $(n-1)^{th}$ frame is a key voice frame and the $(n+m)^{th}$ frame is a non-key voice frame, determine that the frame loss part is a key voice frame; g. If the $(n-1)^{th}$ frame is a non-key voice frame and the $(n+m)^{th}$ frame is a key voice frame, determine that the frame loss part is a key voice frame; h. If the $(n-1)^{th}$ frame is a non-key voice frame and the $(n+m)^{th}$ frame is a silence frame, determine that the frame loss part is a non-key voice frame; or i. If the $(n-1)^{th}$ frame is a silence frame and the $(n+m)^{th}$ frame is a non-key voice frame, determine that the frame loss part is a non-key voice frame.

308. A division unit divides the voice sequence into statements according to the determined frame content characteristic, and divides the statements obtained by means of division into multiple frame loss events.

For example, statement division and frame loss event division may be specifically performed according to the following method:

(1) When a quantity of consecutive silence frames exceeds a preset quantity of times, divide a voice sequence prior to the silence frames into statements.

That is, when at least Ns consecutive silence frames appear, a voice sequence prior to the silence frames is divided into statements, where Ns may be set according to actual application requirements, for example, Ns may be set to 6.

(2) When a distance between two adjacent frame loss parts in the statements is less than or equal to a preset distance, determine the two adjacent frame loss parts as one frame loss event.

(3) When a distance between two adjacent frame loss parts in the statements is greater than a preset distance, determine the two adjacent frame loss parts as two frame loss events.

The preset quantity of times and the preset distance may be set according to actual application requirements. For example, the preset quantity of times may be set to 6, and the preset distance may be set to 10.

309. A non-voice parameter extraction module extracts non-voice parameters according to the frame loss events.

The non-voice parameters may include a location parameter and a discrete distribution parameter, and the non-voice parameters may include a distance between a non-key voice frame and a key voice frame, a quantity of times of voice frame loss, a voice frame length lost at a time, an impairment length, and the like, which are described below:

Distance $L_j$ between a non-key voice frame and a key voice frame: according to auditory perception characteristics of human ears, a longer distance from a lost non-key voice frame to an adjacent key voice frame causes lower distortion.

Quantity $N_1$ of times of voice frame loss: refers to a quantity of times of voice frame loss in a frame loss event.

Voice frame length $N_{0k}$ lost at a time: refers to a quantity of consecutive voice frames lost on each occasion of frame loss.

Impairment length $L_k$: refers to a quantity of non-lost voice frames in two adjacent frame loss events.

Average loss length $N_0$ of a voice frame:

$$N_0 = \frac{\text{total loss length}}{\text{quantity of times of voice frame loss}}.$$

Impairment length L:

$$L = \frac{\sum \text{impairment length}}{\text{quantity of times of voice frame loss} - 1}.$$

310. A voice quality evaluation module performs distortion mapping on the frame loss event according to a preset voice quality evaluation model and according to the obtained non-voice parameters to obtain a total quantity of lost voice frames, which, for example, may be specifically as follows:

A. In a Case of Losing Frames Consecutively

When frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to the total quantity of lost voice frames according to the quantity of actually lost key voice frames and the quantity, of lost key voice frames, obtained by mapping, which is described below:

The mapping the non-key voice frame to the quantity of lost key voice frames may be denoted by the following formula:

$$FLN_{i,j} = f(L_j)$$

For example, specifically, $$FLN_{i,j} = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely

When frames are lost discretely, map impaired frames in the frame loss event to a quantity of lost voice frames according to the quantity of times of voice frame loss, the voice frame length lost at a time, and the impairment length, determine a quantity of actually lost key voice frames according to the quantity of times of voice frame loss, and map the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$FLN_{i,k} = f(N_1, N_{0k}, L_k)$$

For example, specifically, $$\begin{cases} V_k = a_1 * N_{0k}^2 + b_1 * N_{0k} + c_1 \\ A_{0k} = a_2 * \exp\left[-\left(\frac{V_k * N_1 - b_2}{c_2}\right)^2\right] \\ FLN_{i,k} = A_{0k} * \{a_3 * \exp[-b_3 * (L_k - 1)] + c_3\} \end{cases}$$

where $N_{0k}$ is a voice frame length lost at a time, $A_{0k}$ is impairment impact caused by the quantity of times of voice frame loss and a length lost at a time onto a single non-lost voice frame, $L_k$ is an impairment length when the frame loss event occurs for the $k^{th}$ time, and $FLN_{i,k}$ is a quantity, of voice frames, to which a single frame in $L_k$ impaired voice frames in the $i^{th}$ frame loss event is mapped, where parameters $a_1$, $b_1$, $c_1$, $a_2$, $b_2$, $c_2$, $a_3$, $b_3$, and $c_3$ may be obtained by training.

The mapping the frame loss event to the total quantity of lost voice frames may be:

$$FLN_i = n_i + \sum_k (k * FLN_{i,k}).$$

$FLN_i$ is the total quantity, of lost voice frames (that is, the total quantity of lost voice frames), obtained by mapping the frame loss event, and $n_i$ denotes a quantity of actually lost key voice frames.

311. The voice quality evaluation module calculates voice quality of the statement according to the total quantity of lost voice frames, which is as follows:

A quantity of lost voice frames of a statement is:

$$FLN = f(FLN_1, FLN_2, \ldots, FLN_M)$$

where M is a quantity of frame loss events in each statement, and $FLN_i$ is a total quantity, of lost voice frames, obtained by mapping each frame loss event. For example, the function may be specifically as follows:

$$FLN = \left( \sum_i^M (FLN_i)^p \right)^{\frac{1}{p}}.$$

Statement quality $MOS_0$ without considering data packet loss (that is, statement compression distortion) is:

$$MOS_0 = f(R).$$

Therefore, statement quality $Q_n$ with data packet loss considered may be:

$$Q_n = f(MOS_0, FLN).$$

For example, the function may be specifically as follows:

$$\begin{cases} D = 1 - \dfrac{a}{a + FLN^b} \\ Q_n = 1 + (MOS_0 - 1) * (1 - D) \end{cases}$$

where D is statement distortion, $MOS_0$ is the statement quality without considering data packet loss (that is, statement compression distortion), $Q_n$ is the statement quality with data packet loss considered, a and b are fixed parameters of the model, and a and b may be obtained by training.

If a match data table between R and $MOS_0$ is established by means of subjective experiments, $MOS_0$ can be obtained directly by looking up in the table during quality evaluation. For details, reference may be made to Table 2, and no repeated description is given herein again.

312. The voice quality evaluation module evaluates voice quality of the voice sequence according to voice quality of each statement, that is, synthesizes the voice quality of each statement in the voice sequence to obtain the voice quality Q of the voice sequence, which is described below:

$$Q = f(Q_1, Q_2, \ldots, Q_N)$$

where $Q_n$ is statement quality with data packet loss considered, and N is a quantity of statements in the voice sequence. For example, the function may be specifically as follows:

$$Q = \min_{n \in N}(Q_n)$$

where Q is the voice quality of the voice sequence, $Q_n$ is the statement quality with data packet loss considered, and N is the quantity of statements in the voice sequence.

It can be learned from the foregoing that in this embodiment, an obtained voice data packet is parsed in a bit stream layer model-based manner, and a frame content characteristic of the data packet is determined according to a parse result, for example, the frame content characteristic is a silence frame and a voice frame. Then, a voice sequence is divided into statements according to the determined frame content characteristic, and the statements are divided into multiple frame loss events; after non-voice parameters (including a location parameter and a discrete distribution parameter) are extracted according to the frame loss events, voice quality of each statement is evaluated according to a preset voice quality evaluation model and according to the non-voice parameters. Finally, voice quality of the entire voice sequence is evaluated according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

Embodiment 4

Apart from the distortion mapping solution for a frame loss event in Embodiment 2 and Embodiment 3, the frame loss event may also be mapped in another manner. That is, the step "a voice quality evaluation module performs distortion mapping on the frame loss event according to a preset voice quality evaluation model and according to the obtained non-voice parameters to obtain a total quantity of lost voice frames" may be specifically as follows:

A. In a Case of Losing Frames Consecutively

When frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to the total quantity of lost voice frames according to the quantity of actually lost key voice frames and the quantity, of lost key voice frames, obtained by mapping, which is described below:

The mapping the non-key voice frame to the quantity of lost key voice frames may be denoted by the following formula:

$$FLN_{i,j} = f(L_j)$$

For example, specifically, $$FLN_{i,j} = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely

When frames are lost discretely, map impaired frames in the frame loss event to a quantity of lost voice frames according to the voice frame length lost at a time and the impairment length, determine a quantity of actually lost key voice frames according to the quantity of times of voice frame loss, and map the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$FLN = f(N_{0k}, L_k)$$

For example, specifically, $$\begin{cases} A_{0k} = a_1 * N_{0k}^2 + b_1 * N_{0k} + c_1 \\ FLN_{i,k} = A_{0k} * \{a_2 * \exp[-b_2 * L_k] + c_2\} \end{cases}$$

where $FLN_{i,k}$ is a quantity, of voice frames, to which $L_k$ impaired voice frames in the $i^{th}$ frame loss event are mapped, $A_{0k}$ is impairment impact caused by a length lost at a time in the frame loss event onto a single non-lost voice frame, and parameters $a_1$, $b_1$, $C_1$, $a_2$, $b_2$, and $c_2$ may be obtained by training.

The mapping the frame loss event to the total quantity of lost voice frames may be:

$$FLN_i = n_i + \sum_k FLN_{i,k}.$$

$FLN_i$ is the total quantity, of lost voice frames (that is, the total quantity of lost voice frames), obtained by mapping the frame loss event, and $n_i$ denotes a quantity of actually lost key voice frames.

It can be seen that in a case of losing frames consecutively, the distortion mapping processing manner in this embodiment is the same as that in Embodiments 2 and 3. However, in a case of losing frames discretely, the solution used in this embodiment needs to consider only factors such as the distance between a non-key voice frame and a key voice frame, the voice frame length lost at a time, and the impairment length, and does not need to consider the quantity of times of voice frame loss. However, the solution used in Embodiments 2 and 3 needs to consider not only factors such as the distance between a non-key voice frame and a key voice frame, the voice frame length lost at a time, and the impairment length, but also needs to consider the quantity of times of voice frame loss. The two solutions have their respective merits, and may be selected at discretion according to requirements in practical application.

It should be noted that, except that the foregoing distortion mapping method in this embodiment is slightly different from that in Embodiments 2 and 3, implementation of other steps is the same as that in Embodiments 2 and 3, and therefore, is not repeated herein again. For details, reference may be made to Embodiments 2 and 3.

This embodiment can accomplish the same beneficial effects as Embodiments 2 and 3. For the detailed beneficial effects, reference may be made to the previous embodiments, and no repeated description is given herein again.

Embodiment 5

In Embodiments 2, 3 and 4, the extracted non-voice parameters mainly include a distance between a non-key voice frame and a key voice frame, a quantity of times of voice frame loss, a voice frame length lost at a time, an impairment length, and the like. Different from Embodiments 2, 3 and 4, non-voice parameters extracted in this embodiment may include the distance between a non-key voice frame and a key voice frame, the quantity of times of voice frame loss, an average loss length, an average impairment length, and the like, which are described below:

Distance $L_j$ between a non-key voice frame and a key voice frame: according to auditory perception characteristics of human ears, a longer distance from a lost non-key voice frame to an adjacent key voice frame causes lower distortion.

Quantity $N_1$ of times of voice frame loss: refers to a quantity of times of voice frame loss in a frame loss event.

Impairment length $L_k$: refers to a quantity of non-lost voice frames in two adjacent frame loss events.

Average loss length $N_0$ of a voice frame:

$$N_0 = \frac{\text{total loss length}}{\text{quantity of times of voice frame loss}}.$$

Impairment length L:

$$L = \frac{\sum \text{impairment length}}{\text{quantity of times of voice frame loss} - 1}.$$

Because the extracted non-voice parameters are different from those in Embodiments 2, 3, and 4, subsequent distortion mapping for a frame loss event is also different. In Embodiments 2, 3, and 4, distortion of a single frame needs to be calculated, but in this embodiment, distortion of an entire frame loss event can be calculated directly, which is described below:

A. In a Case of Losing Frames Consecutively

When frames are lost consecutively, map a non-key voice frame in the frame loss event to a quantity of lost key voice frames according to the distance between a non-key voice frame and a key voice frame, determine a quantity of actually lost key voice frames according to the quantity of times of voice frame loss, and map the frame loss event to a total quantity of lost voice frames according to the quantity of actually lost key voice frames and the quantity, of lost key voice frames, obtained by mapping.

A processing manner is the same as the processing manner in the case of losing frames consecutively in Embodiments 2, 3, and 4, which may be specifically as follows:

The mapping the non-key voice frame to the quantity of lost key voice frames may be denoted by the following formula:

$$FLN_{i,j} = f(L_j)$$

For example, specifically, $$FLN_{i,j} = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely

When frames are lost discretely, map the frame loss event to a total quantity of lost voice frames according to the average loss length and the average impairment length, which may be denoted by the following formula:

$$\begin{cases} V_1 = a_1 * \exp(b_1 * N_0) + c_1 \\ V_2 = a_2 * \exp(-b_2 * L) \\ FLN_i = a_3 * (V_1 * V_2 * N_3) + b_3 \end{cases}$$

where $FLN_i$ is the total quantity, of lost voice frames, to which the frame loss event is mapped, $N_0$ is an average loss length of the voice frames, L is an impairment length, and parameters $a_1$, $b_1$, $c_1$, $a_2$, $b_2$, $a_3$, and $b_3$ may be obtained by training.

It can be seen that in a case of losing frames consecutively, the distortion mapping processing manner in this embodiment is consistent with that in Embodiments 2, 3, and 4. However, in a case of losing frames discretely, the solution used in this embodiment is different from that in Embodiments 2, 3, and 4. In Embodiments 2, 3, and 4, distortion of a single frame needs to be calculated, and then distortion of an entire frame loss event is obtained by synthesizing distortion of single frames. However, in the solution of this embodiment, the distortion of the entire frame loss event can be calculated directly according to an average loss length and impairment length of voice frames.

It should be noted that the solution provided in this embodiment and the solution provided in Embodiments 2, 3, and 4 have their respective merits, and may be selected at discretion according to requirements in practical application.

In addition, it should further be noted that, except that the non-voice parameter extraction method and the distortion mapping method in this embodiment are slightly different from those in Embodiments 2, 3, and 4, implementation of other steps is the same as that in Embodiments 2, 3, and 4, and therefore, is not repeated herein again. For details, reference may be made to Embodiments 2, 3, and 4.

This embodiment can accomplish the same beneficial effects as Embodiments 2, 3, and 4. For the detailed beneficial effects, reference may be made to the previous embodiments, and no repeated description is given herein again.

Embodiment 6

Figure 4:
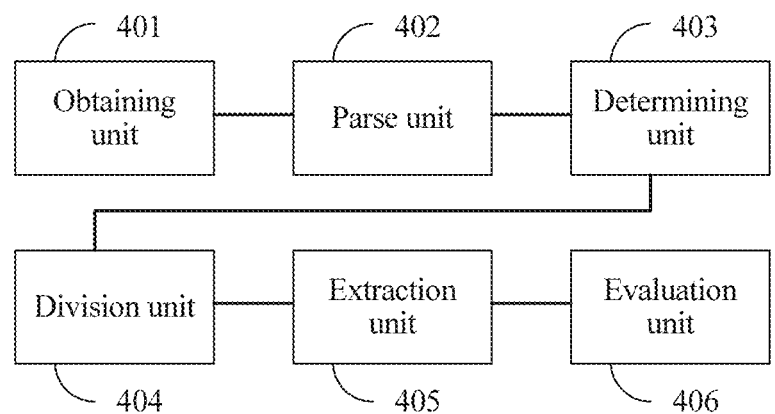
FIG. 4 is a schematic structural diagram of a voice quality evaluation apparatus according to an embodiment of the present application.
Figure 5:
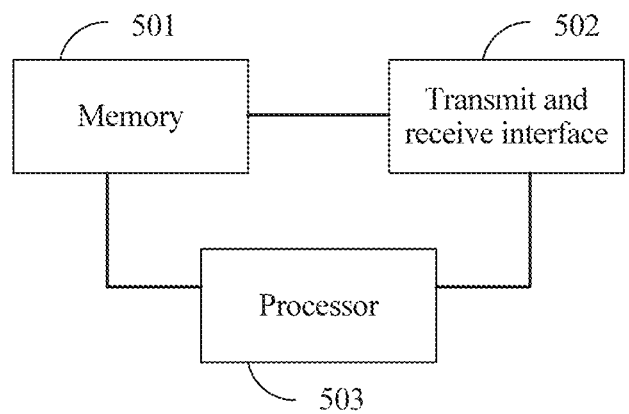
FIG. 5 is a schematic structural diagram of a server according to an embodiment of the present application.

Correspondingly, this embodiment of the present application further provides a voice quality evaluation apparatus. As shown in FIG. 4, the voice quality evaluation apparatus includes an obtaining unit 401, a parse unit 402, a determining unit 403, a division unit 404, an extraction unit 405, and an evaluation unit 406.

The obtaining unit 401 is configured to obtain a voice data packet, where the voice data packet includes a voice sequence.

The parse unit 402 is configured to parse the data packet obtained by the obtaining unit, so as to obtain a parse result.

The determining unit 403 is configured to determine a frame content characteristic of the data packet according to the parse result obtained by the parse unit, where the frame content characteristic may include a silence frame and a voice frame.

The division unit 404 is configured to divide the voice sequence into statements according to the frame content characteristic determined by the determining unit, and divide the statements obtained by means of division into multiple frame loss events.

The extraction unit 405 is configured to extract non-voice parameters according to the frame loss events obtained by the division unit by means of division, where the non-voice parameters include a location parameter and a discrete distribution parameter.

The evaluation unit 406 is configured to evaluate voice quality of each statement according to a preset voice quality evaluation model and according to the non-voice parameters extracted by the extraction unit so as to obtain the voice quality of each statement, and evaluate voice quality of the voice sequence according to the voice quality of each statement.

Depending on a different voice quality evaluation model, a data packet parsing method differs. For example, using a packet layer model and a bit stream layer model as an example, the method may be specifically as follows:

(1) Packet Layer Model

The parse unit 402 may be specifically configured to parse a packet header of the data packet to obtain a parse result, where the parse result may include duration of the voice sequence, a bit quantity of the voice sequence, a frame loss location, voice load, and the like.

For example, using the $i^{th}$ data packet as an example, a method for obtaining the foregoing parameter may be specifically as follows:

Duration $Duration_i$ of a voice sequence included in the $i^{th}$ data packet is as follows:

$$Duration_i = Timestamp_{i+1} - Timestamp_i$$

where $Timestamp_i$ is a timestamp of the $i^{th}$ data packet, and $Timestamp_{i+1}$ is a timestamp of the $(i+1)^{th}$ data packet, which may be read from an RTP header of the data packet.

A bit quantity $B_i$ of the voice sequence included in the $i^{th}$ data packet is as follows:

$$B_i = LIP_i - HIP_i - HUDP_i - HRTP_i$$

where $LIP_i$ is a bit quantity of the $i^{th}$ data packet, and may be directly obtained from an IP header; $HIP_i$ is a length of the IP protocol header of the $i^{th}$ data packet, $HUDP_i$ is a length of a UDP header of the $i^{th}$ data packet, and $HRTP_i$ is a length of an RTP protocol header of the $i^{th}$ data packet.

Voice load and voice duration $Duration_{max}$ of the $i^{th}$ data packet are recorded, where the voice load refers to a bit quantity of RTP load when data packet load is maximal, and the bit quantity is denoted by $B_{max}$. It is generally deemed that the $i^{th}$ data packet is non-silence, and a non-silence bit rate of the $i^{th}$ data packet is:

$$R = \frac{B_{max}}{Duration_{max}}.$$

In addition, a sequence number field in the RTP header denotes order of the data packet, and a location of a lost frame (that is, a frame loss location) and a quantity of lost frames can be determined according to an RTP sequence number of each data packet.

In this case, the determining unit 403 may be specifically configured to determine, in the data packet according to the frame loss location, a frame loss part that currently needs to be detected, determine a frame content characteristic of a previous adjacent non-lost frame and a frame content characteristic of a subsequent adjacent non-lost frame of the frame loss part separately according to the duration of the voice sequence, the bit quantity of the voice sequence, and the voice load, determine a mark of the subsequent adjacent non-lost frame, and determine a frame content characteristic of the frame loss part according to the frame content characteristic of the previous adjacent non-lost frame, the frame content characteristic of the subsequent adjacent non-lost frame, and the mark of the subsequent adjacent non-lost frame.

The determining a frame content characteristic of a non-lost frame according to the duration of the voice sequence, the bit quantity of the voice sequence, and the voice load may specifically include: obtaining an actual valid payload length of the non-lost frame; determining a bit rate (that is, a coding rate) according to the voice load, the bit quantity of the voice sequence, and the duration of the voice sequence; and if a standard valid payload length corresponding to the bit rate is consistent with the actual valid payload length, determining that the non-lost frame is a voice frame; or if a standard valid payload length corresponding to the bit rate is inconsistent with the actual valid payload length, determining that the non-lost frame is a silence frame.

That is, the determining unit 403 may be specifically configured to obtain an actual valid payload length of the non-lost frame; determine a bit rate according to the voice load, the bit quantity of the voice sequence, and the duration of the voice sequence; and if a standard valid payload length corresponding to the bit rate is consistent with the actual valid payload length, determine that the non-lost frame is a voice frame; or if a standard valid payload length corresponding to the bit rate is inconsistent with the actual valid payload length, determine that the non-lost frame is a silence frame.

The "determining a frame content characteristic of the frame loss part according to the frame content characteristic of the previous adjacent non-lost frame, the frame content characteristic of the subsequent adjacent non-lost frame, and the mark of the subsequent adjacent non-lost frame" may be specifically as follows: if both the previous adjacent non-lost frame and the subsequent adjacent non-lost frame are silence frames or the mark of the subsequent adjacent non-lost frame indicates that the subsequent adjacent non-lost frame is a first voice frame (for example, the mark is 1), determining that the frame loss part is a silence frame; otherwise, determining that the frame loss part is a voice frame.

That is, the determining unit 403 may be specifically configured to: if both the previous adjacent non-lost frame and the subsequent adjacent non-lost frame are silence frames or the mark of the subsequent adjacent non-lost frame indicates that the subsequent adjacent non-lost frame is a first voice frame, determine that the frame loss part is a silence frame; otherwise, determine that the frame loss part is a voice frame.

In addition, in order to further improve prediction precision, the voice frame may be further classified into a key voice frame and a non-key voice frame, so that different processing can be performed on the key voice frame and the non-key voice frame subsequently. The key voice frame refers to a frame that much affects the voice quality, and the non-key voice frame refers to a frame that little affects the voice quality.

If the voice frame is classified into a key voice frame and a non-key voice frame, the "determining that the frame loss part is a voice frame" may specifically include the following cases: a. When both the previous adjacent non-lost frame and the subsequent adjacent non-lost frame are voice frames, determine that the frame loss part is a key voice frame; b. When the previous adjacent non-lost frame is a voice frame and the subsequent adjacent non-lost frame is a silence frame, determine that a first half of the frame loss part is a key voice frame and determine that a second half of the frame loss part is a non-key voice frame; or c. When the previous adjacent non-lost frame is a silence frame and the subsequent adjacent non-lost frame is a voice frame, determine that a first half of the frame loss part is a non-key voice frame and determine that a second half of the frame loss part is a key voice frame.

That is, the determining unit 403 may be specifically configured to perform the foregoing operations a to c:

(2) Bit Stream Layer Model

Different from the packet layer model, the bit stream layer model not only needs to parse the packet header of the data packet, but also needs to parse the voice load part, which is described below:

The parse unit 402 may be specifically configured to parse a packet header of the data packet to obtain a parse result, where the parse result includes duration of the voice sequence, a bit quantity of the voice sequence, a frame loss location, voice load, and the like; perform AMR decoding according to the voice load to obtain an AMR-decoded voice signal; and calculate a frame energy and an average frame energy that are of each frame in the AMR-decoded voice signal according to the duration of the voice sequence and the bit quantity of the voice sequence.

Obtaining all kinds of information included in the parse result is specifically the same as that in the packet layer model, and is not repeated herein again.

In this case, the determining unit 403 may be specifically configured to determine, in the data packet according to the frame loss location, a frame loss part that currently needs to be detected, determine a frame content characteristic of a previous adjacent non-lost frame and a frame content characteristic of a subsequent adjacent non-lost frame of the frame loss part according to the calculated frame energy and average frame energy, and determine a frame content characteristic of the frame loss part according to the frame content characteristic of the previous adjacent non-lost frame and the frame content characteristic of the subsequent adjacent non-lost frame.

The determining a frame content characteristic of a non-lost frame according to the calculated frame energy and average frame energy includes: if a frame energy of the non-lost frame is less than or equal to 0, determining that the non-lost frame is a silence frame; if a frame energy of the non-lost frame is greater than 0 and less than the average frame energy, determining that the non-lost frame is a non-key voice frame; or if a frame energy of the non-lost frame is greater than the average frame energy, determining that the non-lost frame is a key voice frame.

That is, the determining unit 403 may be specifically configured to: if a frame energy of the non-lost frame is less than or equal to 0, determine that the non-lost frame is a silence frame; if a frame energy of the non-lost frame is greater than 0 and less than the average frame energy, determine that the non-lost frame is a non-key voice frame; or if a frame energy of the non-lost frame is greater than the average frame energy, determine that the non-lost frame is a key voice frame.

The "determining a frame content characteristic of the frame loss part according to the frame content characteristic of the previous adjacent non-lost frame and the frame content characteristic of the subsequent adjacent non-lost frame" may be specifically as follows: a. If both the previous adjacent non-lost frame and the subsequent adjacent non-lost frame are silence frames, determine that the frame loss part is a silence frame; b. If both the previous adjacent non-lost frame and the subsequent adjacent non-lost frame are key voice frames, determine that the frame loss part is a key voice frame; c. If both the previous adjacent non-lost frame and the subsequent adjacent non-lost frame are non-key voice frames, determine that the frame loss part is a non-key voice frame; d. If the previous adjacent non-lost frame is a key voice frame and the subsequent adjacent non-lost frame is a silence frame, determine that a first half of the frame loss part is a key voice frame and a second half of the frame loss part is a non-key voice frame; e. If the previous adjacent non-lost frame is a silence frame and the subsequent adjacent non-lost frame is a key voice frame, determine that a first half of the frame loss part is a non-key voice frame and a second half of the frame loss part is a key voice frame; f. If the previous adjacent non-lost frame is a key voice frame and the subsequent adjacent non-lost frame is a non-key voice frame, determine that the frame loss part is a key voice frame; g. If the previous adjacent non-lost frame is a non-key voice frame and the subsequent adjacent non-lost frame is a key voice frame, determine that the frame loss part is a key voice frame; h. If the previous adjacent non-lost frame is a non-key voice frame and the subsequent adjacent non-lost frame is a silence frame, determine that the frame loss part is a non-key voice frame; or i. If the previous adjacent non-lost frame is a silence frame and the subsequent adjacent non-lost frame is a non-key voice frame, determine that the frame loss part is a non-key voice frame.

That is, the determining unit 403 may be specifically configured to perform the foregoing operations a to i:

The division unit 404 may be specifically configured to: when a quantity of consecutive silence frames exceeds a preset quantity of times, divide a voice sequence prior to the silence frames into statements; and when a distance between two adjacent frame loss parts in the statements is less than or equal to a preset distance, determine the two adjacent frame loss parts as one frame loss event; or when a distance between two adjacent frame loss parts in the statements is greater than a preset distance, determine the two adjacent frame loss parts as two frame loss events.

The preset quantity of times and the preset distance may be set according to actual application requirements. For example, the preset quantity of times may be set to 6, and the preset distance may be set to 10.

The evaluation unit 406 may be specifically configured to: perform distortion mapping on the frame loss event according to a preset voice quality evaluation model and according to the non-voice parameters extracted by the extraction unit 405 to obtain a total quantity of lost voice frames; and calculate voice quality of the statement according to the total quantity of lost voice frames.

The step "performing distortion mapping on the frame loss event according to a preset voice quality evaluation model and according to the non-voice parameters to obtain a total quantity of lost voice frames" may be specifically implemented in any of the following manners:

(1) The First Manner

The non-voice parameters may include a location parameter, a discrete distribution parameter, and the like, and the non-voice parameters may include a distance between a non-key voice frame and a key voice frame, a quantity of times of voice frame loss, a voice frame length lost at a time, and an impairment length. In this case, the evaluation unit 406 may be specifically configured to perform the following operations:

A. In a Case of Losing Frames Consecutively

When frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping, which is described below:

The mapping the non-key voice frame to the quantity of lost key voice frames may be denoted by the following formula:

$$FLN_{i,j} = f(L_j)$$

For example, specifically, $$FLN = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely

When frames are lost discretely, mapping impaired frames in the frame loss event to a quantity of lost voice frames according to the quantity of times of voice frame loss, the voice frame length lost at a time, and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$FLN_{i,k} = f(N_1, N_{0k}, L_k)$$

For example, specifically, $$\begin{cases} V_k = a_1 * N_{0k}^2 + b_1 * N_{0k} + c_1 \\ A_{0k} = a_2 * \exp\left[-\left(\frac{V_k * N_1 - b_2}{c_2}\right)^2\right] \\ FLN_{i,k} = A_{0k} * \{a_3 * \exp[-b_3 * (L_k - 1)] + c_3\} \end{cases}$$

where $N_{0k}$ is a voice frame length lost at a time, $A_{0k}$ is impairment impact caused by the quantity of times of voice frame loss and a length lost at a time onto a single non-lost voice frame, $L_k$ is an impairment length when the frame loss event occurs for the $k^{th}$ time, and $FLN_{i,k}$ is a quantity, of voice frames, to which a single frame in $L_k$ impaired voice frames in the $i^{th}$ frame loss event is mapped, where parameters a1, b1, c1, a2, b2, c2, a3, b3, and c3 may be obtained by training.

The mapping the frame loss event to the total quantity of lost voice frames may be:

$$FLN_i = n_i + \sum_k (k * FLN_{i,k}).$$

$FLN_i$ is the total quantity, of lost voice frames (that is, the total quantity of lost voice frames), obtained by mapping the frame loss event, and $n_i$ denotes a quantity of actually lost key voice frames.

(2) The Second Manner

The non-voice parameters may include a location parameter, a discrete distribution parameter, and the like, and the non-voice parameters include a distance between a non-key voice frame and a key voice frame, a quantity of times of voice frame loss, a voice frame length lost at a time, and an impairment length. In this case, the evaluation unit 406 may be specifically configured to perform the following operations:

A. In a Case of Losing Frames Consecutively

When frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a Case of Losing Frames Discretely

When frames are lost discretely, mapping impaired frames in the frame loss event to a quantity of lost voice frames according to the voice frame length lost at a time and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$FLN_{i,k} = f(N_{0k}, L_k)$$

For example, specifically, $$\begin{cases} A_{0k} = a_1 * N_{0k}^2 + b_1 * N_{0k} + c_1 \\ FLN_{i,k} = A_{0k} * \{a_2 * \exp[-b_2 * L_k] + c_2\} \end{cases}$$

where $FLN_{i,k}$ is a quantity, of voice frames, to which $L_k$ impaired voice frames in the $i^{th}$ frame loss event are mapped, $A_{0k}$ is impairment impact caused by a length lost at a time in the frame loss event onto a single non-lost voice frame, and parameters $a_1$, $b_1$, $c_1$, $a_2$, $b_2$, and $c_2$ may be obtained by training.

The mapping the frame loss event to the total quantity of lost voice frames may be:

$$FLN_i = n_i + \sum_k FLN_{i,k}.$$

$FLN_i$ is the total quantity, of lost voice frames (that is, the total quantity of lost voice frames), obtained by mapping the frame loss event, and $n_i$ denotes a quantity of actually lost key voice frames.

(3) The Third Manner

Different from the first and second manners, the third manner does not calculate distortion of a single frame, but directly calculates distortion of the entire frame loss event.

The non-voice parameters may include a location parameter, a discrete distribution parameter, and the like, and the non-voice parameters may include a distance between a non-key voice frame and a key voice frame, a quantity of times of voice frame loss, an average loss length, and an average impairment length. In this case, the evaluation unit 406 may be specifically configured to perform the following operations:

A. In a Case of Losing Frames Consecutively

When frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a Case of Losing Frames Discretely

When frames are lost discretely, mapping the frame loss event to the total quantity of lost voice frames according to the average loss length and the average impairment length, which may be denoted by the following formula:

$$\begin{cases} V_1 = a_1 * \exp(b_1 * N_0) + c_1 \\ V_2 = a_2 * \exp(-b_2 * L) \\ FLN_i = a_3 * (V_1 * V_2 * N_3) + b_3 \end{cases}$$

where $FLN_i$ is the total quantity, of lost voice frames, to which the frame loss event is mapped, $N_0$ is an average loss length of the voice frames, L is an impairment length, and parameters $a_1$, $b_1$, $c_1$, $a_2$, $b_2$, $a_3$, and $b_3$ may be obtained by training.

After the total quantity of lost voice frames is obtained, the voice quality of the statement can be calculated according to the total quantity of lost voice frames, which is described below:

A quantity of lost voice frames of a statement is:

$$FLN=f(FLN_1,FLN_2,\ldots,FLN_M)$$

where M is a quantity of frame loss events in each statement, and $FLN_i$ is a total quantity, of lost voice frames, obtained by mapping each frame loss event.

Statement quality $MOS_0$ without considering data packet loss is:

$$MOS_0=f(R).$$

Therefore, statement quality $Q_n$ with data packet loss considered may be:

$$Q_n=f(MOS_0,FLN).$$

If a match data table between R and $MOS_0$ is established by means of subjective experiments, $MOS_0$ can be obtained directly by looking up in the table during quality evaluation.

In specific implementation, each unit described above may be implemented as an independent entity, or may be combined arbitrarily and implemented as a same entity or several entities. For detailed implementation of each unit described above, reference may be made to the previous embodiments, and details are not provided herein again.

The voice quality evaluation apparatus may be specifically integrated in a network-side device such as a server.

It can be learned from the foregoing that the parse unit 402 of the voice quality evaluation apparatus in this embodiment may parse a voice data packet obtained by the obtaining unit 401, and the determining unit 403 determines a frame content characteristic of the data packet according to the parse result, for example, determines that the frame content characteristic is a silence frame or a voice frame, Then, the division unit 404 divides a voice sequence into statements according to the determined frame content characteristic, and divides the statements into multiple frame loss events; after the extraction unit 405 extracts non-voice parameters (including a location parameter and a discrete distribution parameter) according to the frame loss events, the evaluation unit 406 evaluates voice quality of each statement according to a preset voice quality evaluation model and according to the non-voice parameters, and finally, evaluates voice quality of the entire voice sequence according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

Embodiment 7

Accordingly, this embodiment of the present application further provides a communications system, including any voice quality evaluation apparatus in an embodiment of the present application. For details of the voice quality evaluation apparatus, reference may be made to Embodiment 6, and no repeated description is given herein again.

Because the communications system may include any voice quality evaluation apparatus in an embodiment of the present application, the communications system can accomplish beneficial effects of any voice quality evaluation apparatus in an embodiment of the present application. For details, refer to the previous embodiments, and no repeated description is given herein again.

Embodiment 8

In addition, this embodiment of the present application further provides a network-side device, including a memory 501 configured to store data, a transmit and receive interface 502 configured to transmit and receive data, and a processor 503.

The processor 503 may be configured to obtain a voice data packet by using the transmit and receive interface 502, where the voice data packet includes a voice sequence; parse the data packet to obtain a parse result; determine a frame content characteristic of the data packet according to the parse result; divide the voice sequence into statements according to the determined frame content characteristic, and divide the statements obtained by means of division into multiple frame loss events; extract non-voice parameters according to the frame loss events; evaluate voice quality of each statement according to a preset voice quality evaluation model and according to the non-voice parameters to obtain the voice quality of each statement; and evaluate voice quality of the voice sequence according to the voice quality of each statement.

Depending on a different voice quality evaluation model, a method used by the processor 503 to parse a data packet differs. For example, using a packet layer model and a bit stream layer model as an example, the parsing the data packet by the processor 503 may be specifically as follows:

(1) Packet Layer Model

Specifically, a packet header of the data packet may be parsed to obtain a parse result. The parse result may include duration of the voice sequence, a bit quantity of the voice sequence, a frame loss location, voice load, and the like. For example, using the $i^{th}$ data packet as an example, a method for obtaining the foregoing parameter may be specifically as follows:

Duration $Duration_i$ of a voice sequence included in the $i^{th}$ data packet is as follows:

$$Duration_i = Timestamp_{i+1} - Timestamp_i$$

where $Timestamp_i$ is a timestamp of the $i^{th}$ data packet, and $Timestamp_{i+1}$ is a timestamp of the $(i+1)^{th}$ data packet, which may be read from a RTP header of the data packet.

A bit quantity $B_i$ of the voice sequence included in the $i^{th}$ data packet is as follows:

$$B_i = LIP_i - HIP_i - HUDP_i - HRTP_i$$

where $LIP_i$ is a bit quantity of the $i^{th}$ data packet, and may be directly obtained from an IP header; $HIP_i$ is a length of the IP protocol header of the $i^{th}$ data packet, $HUDP_i$ is a length of a UDP protocol header of the $i^{th}$ data packet, and $HRTP_i$ is a length of an RTP protocol header of the $i^{th}$ data packet.

Voice load and voice duration $Duration_{max}$ of the $i^{th}$ data packet are recorded, where the voice load refers to a bit quantity of RTP load when data packet load is maximal, and the bit quantity is denoted by $B_{max}$. It is generally deemed that the $i^{th}$ data packet is non-silence, and a non-silence bit rate of the $i^{th}$ data packet is:

$$R = \frac{B_{max}}{Duration_{max}}.$$

In addition, a sequence number field in the RTP header denotes order of the data packet, and a location of a lost frame (that is, a frame loss location) and a quantity of lost frames can be determined according to an RTP sequence number of each data packet.

(2) Bit Stream Layer Model

Different from the packet layer model, the bit stream layer model not only needs to parse the packet header of the data packet, but also needs to parse the voice load part, which is described below:

A. Parse a packet header of the data packet to obtain a parse result, where the parse result may include information such as duration of the voice sequence, a bit quantity of the voice sequence, a frame loss location, and voice load. A specific obtaining method of the information is the same as that in the packet layer model, and is not described herein again.

B. Perform AMR decoding according to the voice load to obtain an AMR-decoded voice signal.

C. Calculate a frame energy and an average frame energy that are of each frame in the AMR-decoded voice signal according to the duration of the voice sequence and the bit quantity of the voice sequence.

The frame energy of each frame may be obtained by quantization according to auditory characteristics of human ears and subjective experience. If the frame energy is greater than 0, the frame is a voice frame, and an average energy of the voice frame is calculated accordingly to obtain the average frame energy.

Because the parse results obtained according to different voice quality evaluation models are different, a manner of determining the frame content characteristic of the data packet also differs. For example, still using the packet layer model and the bit stream layer model as an example, the manner of determining the frame content characteristic of the data packet by the processor 503 may be specifically as follows:

(1) Packet Layer Model

A. In the data packet, according to the frame loss location, determine a frame loss part that currently needs to be detected.

B. Determine a frame content characteristic of a previous adjacent non-lost frame and a frame content characteristic of a subsequent adjacent non-lost frame of the frame loss part separately according to the duration of the voice sequence, the bit quantity of the voice sequence, and the voice load, and determine a mark of the subsequent adjacent non-lost frame, where the mark is a frame serial number.

The determining a frame content characteristic of a non-lost frame according to the duration of the voice sequence, the bit quantity of the voice sequence, and the voice load may specifically include: obtaining an actual valid payload length of the non-lost frame; determining a bit rate (that is, a coding rate) according to the voice load, the bit quantity of the voice sequence, and the duration of the voice sequence; and if a standard valid payload length corresponding to the bit rate is consistent with the actual valid payload length, determining that the non-lost frame is a voice frame; or if a standard valid payload length corresponding to the bit rate is inconsistent with the actual valid payload length, determining that the non-lost frame is a silence frame.

C. Determine a frame content characteristic of the frame loss part according to the frame content characteristic of the previous adjacent non-lost frame, the frame content characteristic of the subsequent adjacent non-lost frame, and the mark of the subsequent adjacent non-lost frame, which, for example, may be specifically as follows:

If both the previous adjacent non-lost frame and the subsequent adjacent non-lost frame are silence frames or the mark of the subsequent adjacent non-lost frame indicates that the subsequent adjacent non-lost frame is a first voice frame (for example, the mark is 1), determine that the frame loss part is a silence frame; otherwise, determine that the frame loss part is a voice frame.

In addition, in order to further improve prediction precision, the voice frame may be further classified into a key voice frame and a non-key voice frame, so that different processing can be performed on the key voice frame and the non-key voice frame subsequently. The key voice frame refers to a frame that much affects the voice quality, and the non-key voice frame refers to a frame that little affects the voice quality.

If the voice frame is classified into a key voice frame and a non-key voice frame, the step "determining that the frame loss part is a voice frame" may specifically include the following cases: a. When both the previous adjacent non-lost frame and the subsequent adjacent non-lost frame are voice frames, determine that the frame loss part is a key voice frame; b. When the previous adjacent non-lost frame is a voice frame and the subsequent adjacent non-lost frame is a silence frame, determine that a first half of the frame loss part is a key voice frame and determine that a second half of the frame loss part is a non-key voice frame; or c. When the previous adjacent non-lost frame is a silence frame and the subsequent adjacent non-lost frame is a voice frame, determine that a first half of the frame loss part is a non-key voice frame and determine that a second half of the frame loss part is a key voice frame.

(2) Bit Stream Layer Model

Frame content detection in the bit stream layer model is more refined than that in the packet layer model. For example, the voice frame may include a key voice frame and a non-key voice frame.

For the bit stream layer model, the operation of "determining a frame content characteristic of the data packet according to the obtained parse result" may be specifically as follows:

A. In the data packet, according to the frame loss location, determine a frame loss part that currently needs to be detected.

B. Determine a frame content characteristic of a previous adjacent non-lost frame and a frame content characteristic of a subsequent adjacent non-lost frame of the frame loss part according to the calculated frame energy and average frame energy.

The determining a frame content characteristic of a non-lost frame according to the calculated frame energy and average frame energy includes: if a frame energy of the non-lost frame is less than or equal to 0, determining that the non-lost frame is a silence frame; if a frame energy of the non-lost frame is greater than 0 and less than the average frame energy, determining that the non-lost frame is a non-key voice frame; or if a frame energy of the non-lost frame is greater than the average frame energy, determining that the non-lost frame is a key voice frame.

C. The determining a frame content characteristic of the frame loss part according to the frame content characteristic of the previous adjacent non-lost frame and the frame content characteristic of the subsequent adjacent non-lost frame may be specifically as follows: a. If both the previous adjacent non-lost frame and the subsequent adjacent non-lost frame are silence frames, determine that the frame loss part is a silence frame; b. If both the previous adjacent non-lost frame and the subsequent adjacent non-lost frame are key voice frames, determine that the frame loss part is a key voice frame; c. If both the previous adjacent non-lost frame and the subsequent adjacent non-lost frame are non-key voice frames, determine that the frame loss part is a non-key voice frame; d. If the previous adjacent non-lost frame is a key voice frame and the subsequent adjacent non-lost frame is a silence frame, determine that a first half of the frame loss part is a key voice frame and a second half of the frame loss part is a non-key voice frame; e. If the previous adjacent non-lost frame is a silence frame and the subsequent adjacent non-lost frame is a key voice frame, determine that a first half of the frame loss part is a non-key voice frame and a second half of the frame loss part is a key voice frame; f. If the previous adjacent non-lost frame is a key voice frame and the subsequent adjacent non-lost frame is a non-key voice frame, determine that the frame loss part is a key voice frame; g. If the previous adjacent non-lost frame is a non-key voice frame and the subsequent adjacent non-lost frame is a key voice frame, determine that the frame loss part is a key voice frame; h. If the previous adjacent non-lost frame is a non-key voice frame and the subsequent adjacent non-lost frame is a silence frame, determine that the frame loss part is a non-key voice frame; or i. If the previous adjacent non-lost frame is a silence frame and the subsequent adjacent non-lost frame is a non-key voice frame, determine that the frame loss part is a non-key voice frame.

When performing statement division and frame loss event division, the processor 503 may specifically perform the following operations: when a quantity of consecutive silence frames exceeds a preset quantity of times, dividing a voice sequence prior to the silence frames into statements; and when a distance between two adjacent frame loss parts in the statements is less than or equal to a preset distance, determining the two adjacent frame loss parts as one frame loss event; or when a distance between two adjacent frame loss parts in the statements is greater than a preset distance, determining the two adjacent frame loss parts as two frame loss events.

The preset quantity of times and the preset distance may be set according to actual application requirements. For example, the preset quantity of times may be set to 6, and the preset distance may be set to 10.

In addition, when evaluating the voice quality of each statement according to the preset voice quality evaluation model and according to the non-voice parameters, the processor 503 may specifically perform distortion mapping on the frame loss event according to the preset voice quality evaluation model and according to the non-voice parameters to obtain a total quantity of lost voice frames, and then calculate voice quality of the statement according to the total quantity of lost voice frames.

The "performing distortion mapping on the frame loss event according to the preset voice quality evaluation model and according to the non-voice parameters to obtain a total quantity of lost voice frames" may be specifically implemented in any of the following manners:

(1) The First Manner

The non-voice parameters may include a location parameter, a discrete distribution parameter, and the like. The non-voice parameters may include a distance between a non-key voice frame and a key voice frame, a quantity of times of voice frame loss, a voice frame length lost at a time, and an impairment length, and then in this case, the step "performing distortion mapping on the frame loss event according to the preset voice quality evaluation model and according to the non-voice parameters to obtain a total quantity of lost voice frames" may include:

A. In a Case of Losing Frames Consecutively

When frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity of lost key voice frames, obtained by mapping, which is described below:

The mapping the non-key voice frame to the quantity of lost key voice frames may be denoted by the following formula:

$$FLN_{i,j} = \exp(-0.033 * L_j)$$

where $FLN_{i,j}$ is a quantity, of key voice frames, to which the $j^{th}$ non-key voice frame in the $i^{th}$ frame loss event is mapped, and $L_j$ is a distance between the $j^{th}$ non-key voice frame and the key voice frame.

The total quantity of lost voice frames may be:

$$FLN_i = n_i + \sum_j FLN_{i,j}$$

where $FLN_i$ is a total quantity, of lost voice frames (that is, a total quantity of lost key voice frames), obtained by mapping the $i^{th}$ frame loss event, and $n_i$ denotes a quantity of actually lost key voice frames.

B. In a Case of Losing Frames Discretely when frames are lost discretely, mapping impaired frames in the frame loss event to a quantity of lost voice frames according to the quantity of times of voice frame loss, the voice frame length lost at a time, and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$\begin{cases} V_k = a_1 * N_{0k}^2 + b_1 * N_{0k} + c_1 \\ A_{0k} = a_2 * \exp\left[-\left(\frac{V_k * N_1 - b_2}{c_2}\right)^2\right] \\ FLN_{i,k} = A_{0k} * \{a_3 * \exp[-b_3 * (L_k - 1)] + c_3\} \end{cases}$$

where $N_{0k}$ is a voice frame length lost at a time, $A_{0k}$ is impairment impact caused by the quantity of times of voice frame loss and a length lost at a time onto a single non-lost voice frame, $L_k$ is an impairment length when the frame loss event occurs for the $k^{th}$ time, and $FLN_{i,k}$ is a quantity, of voice frames, to which a single frame in $L_k$ impaired voice frames in the $i^{th}$ frame loss event is mapped, where parameters $a_1$, $b_1$, $c_1$, $a_2$, $b_2$, $c_2$, $a_3$, $b_3$, and $c_3$ may be obtained by training.

The mapping the frame loss event to the total quantity of lost voice frames may be:

$$FLN_i = n_i + \sum_k (k * FLN_{i,k}).$$

$FLN_i$ is the total quantity, of lost voice frames (that is, the total quantity of lost voice frames), obtained by mapping the frame loss event, and $n_i$ denotes a quantity of actually lost key voice frames.

(2) The Second Manner

The non-voice parameters may include a location parameter, a discrete distribution parameter, and the like. The non-voice parameters include a distance between a non-key voice frame and a key voice frame, a quantity of times of voice frame loss, a voice frame length lost at a time, and an impairment length, and then the performing distortion mapping on the frame loss event according to the preset voice quality evaluation model and according to the non-voice parameters to obtain a total quantity of lost voice frames includes:

A. In a Case of Losing Frames Consecutively when frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a Case of Losing Frames Discretely when frames are lost discretely, mapping impaired frames in the frame loss event to a quantity of lost voice frames according to the voice frame length lost at a time and the impairment length, determining a quantity of actually lost key voice frames according to the quantity of times of voice frame loss, and mapping the frame loss event to the total quantity of lost voice frames according to the quantity of actually lost key voice frames and the quantity, of lost voice frames, obtained by mapping, which, for example, may be specifically as follows:

The mapping the impaired frames to the quantity of lost voice frames may be denoted by the following formula:

$$\begin{cases} A_{0k} = a_1 * N_{0k}^2 + b_1 * N_{0k} + c_1 \\ FLN_{i,k} = A_{0k} * \{a_2 * \exp[-b_2 * L_k] + c_2\} \end{cases}$$

where $FLN_{i,k}$ is a quantity, of voice frames, to which $L_k$ impaired voice frames in the $i^{th}$ frame loss event are mapped, $A_{0k}$ is impairment impact caused by a length lost at a time in the frame loss event onto a single non-lost voice frame, and parameters $a_1$, $b_1$, $c_1$, $a_2$, $b_2$, and $c_2$ may be obtained by training.

The mapping the frame loss event to the total quantity of lost voice frames may be:

$$FLN_i = n_i + \sum_k FLN_{i,k}.$$

$FLN_i$ is the total quantity, of lost voice frames (that is, the total quantity of lost voice frames), obtained by mapping the frame loss event, and $n_i$ denotes a quantity of actually lost key voice frames.

(3) The Third Manner

Different from the first and second manners, the third manner does not calculate distortion of a single frame, but directly calculates distortion of the entire frame loss event.

The non-voice parameters may include a location parameter, a discrete distribution parameter, and the like. The non-voice parameters may include a distance between a non-key voice frame and a key voice frame, a quantity of times of voice frame loss, an average loss length, and an average impairment length, and then the mapping lost frames in different locations in the frame loss event and lost frames of different discrete distributions to the total quantity of lost voice frames according to the non-voice parameters may specifically include:

A. In a Case of Losing Frames Consecutively

When frames are lost consecutively, mapping a non-key voice frame in the frame loss event to a quantity of lost key voice frames according to the distance between a non-key voice frame and a key voice frame, determining a quantity of actually lost key voice frames according to the quantity of times of voice frame loss, and mapping the frame loss event to the total quantity of lost voice frames according to the quantity of actually lost key voice frames and the quantity, of lost key voice frames, obtained by mapping.

A processing manner is the same as the processing manner in the case of losing frames consecutively in the first manner. For details, refer to the description given above, and no repeated description is given herein again.

B. In a Case of Losing Frames Discretely

When frames are lost discretely, mapping the frame loss event to the total quantity of lost voice frames according to the average loss length and the average impairment length, which may be denoted by the following formula:

$$\begin{cases} V_1 = a_1 * \exp(b_1 * N_0) + c_1 \\ V_2 = a_2 * \exp(-b_2 * L) \\ FLN_i = a_3 * (V_1 * V_2 * N_3) + b_3 \end{cases}$$

where $FLN_i$ is the total quantity, of lost voice frames, to which the frame loss event is mapped, No is an average loss length of the voice frames, L is an impairment length, and parameters $a_1$, $b_1$, $c_1$, $a_2$, $b_2$, $a_3$, and $b_3$ may be obtained by training.

After the total quantity of lost voice frames is obtained, the voice quality of the statement can be calculated according to the total quantity of lost voice frames, which is described below:

A quantity of lost voice frames of a statement is:

$$FLN=f(FLN_1, FLN_2, \ldots, FLN_M)$$

where M is a quantity of frame loss events in each statement, and $FLN_i$ is a total quantity, of lost voice frames, obtained by mapping each frame loss event.

Statement quality $MOS_0$ without considering data packet loss is:

$$MOS_0 = f(R).$$

Therefore, statement quality $Q_n$ with data packet loss considered may be:

$$Q_n = f(MOS_0, FLN).$$

If a match data table between R and $MOS_0$ is established by means of subjective experiments, $MOS_0$ can be obtained directly by looking up in the table during quality evaluation.

For specific implementation of each operation described above, reference may be made to the previous embodiment, and no repeated description is given herein again.

It can be learned from the foregoing that the network-side device in this embodiment parses an obtained voice data packet, and determines a frame content characteristic of the data packet according to a parse result, for example, determines that the frame content characteristic is a silence frame or a voice frame; then divides a voice sequence into statements according to the determined frame content characteristic, and divides the statements into multiple frame loss events; after non-voice parameters (including a location parameter and a discrete distribution parameter) are extracted according to the frame loss events, evaluates voice quality of each statement according to a preset voice quality evaluation model and according to the non-voice parameters; and finally, evaluates voice quality of the entire voice sequence according to the voice quality of each statement. In this solution, the voice sequence can be divided into statements, and the statements can be divided into frame loss events, and therefore, a frame loss mode in a single frame loss event is relatively simple, and distortion impact brought by each frame loss event can be researched easily. In addition, according to this solution, the frame content characteristic (for example, a determined silence frame or voice frame) and a frame loss location are also factors considered in a process of evaluating voice quality, and therefore, compared with a prior-art solution in which the voice quality is measured according to only average distortion information, this solution can effectively improve precision of evaluating the voice quality. That is, this solution can improve prediction precision significantly and accuracy of an evaluation result.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The foregoing has described in detail the voice quality evaluation method, apparatus, and system according to the embodiments of the present application. The principle and implementation of the present application are described herein through specific examples. The description about the embodiments of the present application is merely provided to help understand the method and core ideas of the present application. In addition, a person of ordinary skill in the art can make variations and modifications to the present application in terms of the specific implementations and application scopes according to the ideas of the present application. Therefore, the content of specification shall not be construed as a limitation on the present application.

What is claimed is:

1. A voice quality evaluation method for use in a communication system including a voice quality evaluation apparatus, packet loss occurring during transmission of a voice data packet in the communications system and the method being performed by the voice quality evaluation apparatus comprising a memory and a processor, and the method comprising:
obtaining, by the processor, a voice data packet comprising a voice sequence;
parsing the data packet to obtain a parse result by parsing a packet header of the data packet to obtain the parse result, the parse result comprising a duration of the voice sequence, a bit quantity of the voice sequence, a frame loss location, and a voice load;

determining, based on the parse result, a first frame content characteristic of the voice data packet, the first frame content characteristic being one of a silence frame or a voice frame, and the first frame content characteristic of the voice data packet being determined by:

determining, in the data packet according to the frame loss location, a frame loss part that needs to be detected;

determining a second frame content characteristic of a previous adjacent non-lost frame and a third frame content characteristic of a subsequent adjacent non-lost frame of the frame loss part according to the duration of the voice sequence, the bit quantity of the voice sequence, and the voice load, and the second frame content and the third frame content being determined by:

obtaining an actual valid payload length of the previous adjacent non-lost frame or the subsequent adjacent non-lost frame;

determining a bit rate according to the voice load, the bit quantity, and the duration;

determining that the previous adjacent non-lost frame or the subsequent adjacent non-lost frame is a voice frame when a standard valid payload length corresponding to the bit rate is consistent with the actual valid payload length; and determining that the previous adjacent non-lost frame or the subsequent adjacent non-lost frame is a silence frame when the standard valid payload length is inconsistent with the actual valid payload length; and determining a fourth frame content characteristic of the frame loss part according to the second frame content characteristic, the third frame content characteristic, and a mark of the subsequent adjacent non-lost frame, the fourth frame content characteristic of the frame loss part being determined by:

determining that the frame loss part is a silence frame when both the previous adjacent non-lost frame and the subsequent adjacent non-lost frame are silence frames or when the mark indicates that the subsequent adjacent non-lost frame is a first voice frame; and determining that the frame loss part is a voice frame when either the previous adjacent non-lost frame or the subsequent adjacent non-lost frame is not a silence frame and when the mark does not indicate that the subsequent adjacent non-lost frame is a first voice frame;

dividing the voice sequence into a plurality of statements according to the first frame content characteristic;

dividing each of the plurality of statements into a plurality of frame loss events;

extracting a plurality of non-voice parameters according to the plurality of frame loss events, the plurality of non-voice parameters comprising a location parameter for indicating a location of a lost frame location and a discrete distribution parameter for indicating a discrete distribution of the lost frame;

evaluating a voice quality of each one of the plurality of statements according to a preset voice quality evaluation model and with the plurality of non-voice parameters by:

mapping lost voice frames in different locations in the frame loss events or lost voice frames of different discrete distributions to a total quantity of the lost voice frames according to the preset voice quality evaluation model and the plurality of non-voice parameters; and calculating the voice quality of each of the statements according to the total quantity; and evaluating a voice quality of the voice sequence according to the voice quality of the each one of the plurality of statements to produce an evaluated voice quality for network measurement or network planning.

2. The method of claim 1, wherein the voice frame comprises a key voice frame and a non-key voice frame, and determining that the frame loss part is the voice frame comprising:

determining that the frame loss part is a key voice frame when both the previous adjacent non-lost frame and the subsequent adjacent non-lost frame are voice frames;

determining that a first half of the frame loss part is a key voice frame and a second half of the frame loss part is a non-key voice when the previous adjacent non-lost frame is a voice frame and the subsequent adjacent non-lost frame is a silence frame; and determining that a first half of the frame loss part is a non-key voice frame and a second half of the frame loss part is a key voice frame when the previous adjacent non-lost frame is a silence frame and the subsequent adjacent non-lost frame is a voice frame.

3. The method of claim 1, wherein dividing the voice sequence and dividing the statements comprises:

dividing a voice sequence prior to silence frames into the statements when a quantity of consecutive silence frames exceeds a preset quantity;

determining that two adjacent frame loss parts in the statements are one frame loss event when a distance between the two adjacent frame loss parts is less than or equal to a preset distance; and determining that the two adjacent frame loss parts are two frame loss events when the distance is greater than the preset distance.

4. The method of claim 1, wherein the non-voice parameters comprise a distance between a non-key voice frame and a key voice frame, a quantity of times of voice frame loss, a voice frame length lost at a time, and an impairment length, and the mapping comprising:

mapping a non-key voice frame in the frame loss event to a quantity of lost key voice frames according to the distance;

determining a quantity of actually lost key voice frames according to the quantity of times of voice frame loss; and mapping the frame loss event to the total quantity of lost voice frames according to the quantity of actually lost key voice frames and the quantity of lost key voice frames when frames are lost consecutively, and the method further comprising either:

mapping impaired frames in the frame loss event to a quantity of lost voice frames according to the quantity of times of voice frame loss, the voice frame length lost at a time, and the impairment length;

determining a quantity of actually lost key voice frames according to the quantity of times of voice frame loss; and mapping the frame loss event to the total quantity of lost voice frames according to the quantity of actually lost key voice frames and the quantity, of lost voice frames, obtained by mapping when frames are lost discretely; or mapping the impaired frames in the frame loss event to the quantity of lost voice frames according to the voice frame length lost at a time, and the impairment length;

determining a quantity of actually lost key voice frames according to the quantity of times of voice frame loss; and mapping the frame toss event to the total quantity of lost voice frames according to the quantity of actually lost key voice frames and the quantity of lost voice frames when frames are lost discretely.

5. The method of claim 1, wherein the non-voice parameters comprise a distance between a non-key voice frame and a key voice frame, a quantity of times of voice frame loss, an average loss length, and an average impairment length, and mapping the lost frames in different locations in the frame loss event and lost frames of different discrete distributions to the total quantity of lost voice frames according to the non-voice parameters comprising:

mapping a non-key voice frame in the frame loss event to a quantity of lost key voice frames according to the distance between a non-key voice frame and a key voice frame;

determining a quantity of actually lost key voice frames according to the quantity of times of voice frame loss; and either mapping the frame loss event to the total quantity of lost voice frames according to the quantity of actually lost key voice frames and the quantity of lost key voice frames when frames are lost consecutively; or mapping the frame loss event to the total quantity of lost voice frames according to the average loss length and the average impairment length when frames are lost discretely.

6. A voice quality evaluation method for use in a communication system including a voice quality evaluation apparatus, packet loss occurring during transmission of a voice data packet in the communications system and the method being performed by the voice quality evaluation apparatus comprising a memory and a processor, and the method comprising:

obtaining, by the processor, a voice data packet comprising a voice sequence;

parsing the data packet to obtain a parse result by:
parsing a packet header of the data packet to obtain the parse result comprising a duration of the voice sequence, a bit quantity of the voice sequence, a frame loss location, and a voice load;

performing adaptive multi-rate (AMR) decoding according to the voice load to obtain an AMR-decoded voice signal; and calculating a frame energy and an average frame energy of each frame in the AMR-decoded voice signal according to the duration of the voice sequence and the bit quantity of the voice sequence;

determining, based on the parse result, a first frame content characteristic of the voice data packet, the first frame content characteristic being one of a silence frame or a voice frame, and the first frame content characteristic is determined by:

determining, in the data packet according to the frame loss location, a frame loss part that needs to be detected;

determining a second frame content characteristic of a previous adjacent non-lost frame and a third frame content characteristic of a subsequent adjacent non-lost frame of the frame loss part according to the frame energy and the average frame energy, the second frame content characteristic and third frame content characteristic being determined by:

determining that the previous non-lost frame or the subsequent non-lost frame is a silence frame when a frame energy of the previous non-lost frame or the subsequent non-lost frame is less than or equal to zero;

determining that the previous non-lost frame or the subsequent non-lost frame is a non-key voice frame when a frame energy of the previous non-lost frame or the subsequent non-lost frame is greater than zero and less than the average frame energy; and determining that the previous non-lost frame or the subsequent non-lost frame is a key voice frame when a frame energy of the previous non-lost frame or the subsequent non-lost frame is greater than the average frame energy;

determining a fourth frame content characteristic of the frame loss part according to the second frame content characteristic and the third frame content characteristic by:

determining that the frame loss part is a silence frame when the previous adjacent non-lost frame and the subsequent adjacent non-lost frame are silence frames;

determining that the frame loss part is a key voice frame when the previous adjacent non-lost frame and the subsequent adjacent non-lost frame are key voice frames;

determining the frame loss part is a non-key voice frame when the previous adjacent non-lost frame and the subsequent adjacent non-lost frame are non-key voice frames;

determining that a first half of the frame loss part is a key voice frame and a second half of the frame loss part is a non-key voice frame when the previous adjacent on-lost frame is a key voice frame and the subsequent adjacent non-lost frame is a silence frame;

determining that a first half of the frame loss part is a non-key voice frame and a second half of the frame loss part is a key voice frame when the previous adjacent non-lost frame is a silence frame and the subsequent adjacent non-lost frame is a key voice frame;

determining that the frame loss part is a key voice frame when the previous adjacent non-lost frame is a key voice frame and the subsequent adjacent non-lost frame is a non-key voice frame;

determining that the frame loss part is a key voice frame when the previous adjacent non-lost frame is a non-key voice frame and the subsequent adjacent non-lost frame is a key voice frame;

determining that the frame loss part is a non-key voice frame when the previous adjacent non-lost frame is a non-key voice frame and the subsequent adjacent non-lost frame is a silence frame; and determining that the frame loss part is a non-key voice frame when the previous adjacent non-lost frame is a silence frame and the subsequent adjacent non-lost frame is a non-key voice frame;

dividing the voice sequence into a plurality of statements according to the first frame content characteristic;
dividing each of the plurality of statements into a plurality of frame loss events;
extracting a plurality of non-voice parameters according to the plurality of frame loss events, the plurality of non-voice parameters comprising a location parameter for indicating a location of a lost frame location and a discrete distribution parameter for indicating, a discrete distribution of the lost frame;
evaluating a voice quality of each one of the plurality of statements according to a preset voice quality evaluation model and with the plurality of non-voice parameters; and
evaluating a voice quality of the voice sequence according to the voice quality of the each one of the plurality of statements to produce an evaluated voice quality for network measurement or network planning.

7. A voice quality evaluation apparatus for use in a communication system in which packet loss occurs during transmission of a voice data packet, the apparatus comprising:
a memory storing instructions; and
a processor coupled to the memory and configured to:
obtain a data packet including a voice sequence;
parse the data packet to obtain a parse result;
determine a first frame content characteristic of the data packet, the first frame content characteristic being one of a silence frame or a voice frame;
divide the voice sequence into a plurality of statements according to the first frame content characteristic;
divide the statements into frame loss events;
extract a plurality of non-voice parameters according to the frame loss events, the plurality of non-voice parameters comprising a location parameter for indicating a location of a lost frame and a discrete distribution parameter for indicating a discrete distribution of the lost frame;
evaluate voice quality of each one of the plurality of statements according to a preset voice quality evaluation model and with the non-voice parameters;
evaluate the voice quality of the voice sequence according to the voice quality of the each one of the plurality of statements to produce an evaluated voice quality for network measurement or network planning;
parse a packet header of the data packet to obtain a parse result comprising duration of the voice sequence, a bit quantity of the voice sequence, a frame loss location, and voice load;
determine in the data packet according to the frame loss location, a frame loss part that needs to be detected;
determine a second frame content characteristic of a previous adjacent non-lost frame and a third frame content characteristic of a subsequent adjacent non-lost frame of the frame loss part according to the duration, the bit quantity, and the voice load;
determine a mark of the subsequent adjacent non-lost frame;
determine a fourth frame content characteristic of the frame loss part according to the second frame content characteristic, the third frame content characteristic, and the mark;
obtain an actual valid payload length of a non-lost frame;
determine a bit rate according to the voice load, the bit quantity of the voice sequence, and the duration of the voice sequence;
determine that the non-lost frame is a voice frame when a standard valid payload length corresponding to the bit rate is consistent with the actual valid payload length;
determine that the non-lost frame is a silence frame when the standard valid payload length is inconsistent with the actual valid payload length;
determine that the frame loss part is a silence frame when both the previous adjacent non-lost frame and the subsequent adjacent non-lost frame are silence frames or the mark indicates that the subsequent adjacent non-lost frame is a first voice frame; and
determine that the frame loss part is a voice frame when either the previous adjacent non-lost frame or the subsequent adjacent non-lost frame is not a silence frame, and the mark does not indicate that the subsequent adjacent non-lost frame is a first voice frame, and
the processor being further configured to evaluate the voice quality of each of the statements by:
mapping lost voice frames in different locations in the frame loss events or lost voice frames of different discrete distributions to a total quantity of the lost voice frames according to the preset voice quality evaluation model and the plurality of non-voice parameters; and
calculating the voice quality of each of the statements according to the total quantity.

8. The apparatus of claim 7, wherein the voice frame comprises a key voice frame and a non-key voice frame, and the processor being further configured to:
determine that the frame loss part is a key voice frame when both the previous adjacent non-lost frame and the subsequent adjacent non-lost frame are voice frames;
determine that a first half of the frame loss part is a key voice frame and a second half of the frame loss part is a non-key voice frame when the previous adjacent non-lost frame is a voice frame and the subsequent adjacent non-lost frame is a silence frame; and
determine that a first half of the frame loss part is a ion-key voice frame and a second half of the frame loss part is a key voice frame when the previous adjacent non-lost frame is a silence frame and the subsequent adjacent non-lost frame is a voice frame.

9. A voice quality evaluation apparatus for use in a communication system in which packet loss occurs during transmission of a voice data packet, the apparatus comprising:
a memory storing instructions; and
a processor coupled to the memory and configured to:
obtain a data packet including a voice sequence;
parse the data packet to obtain a parse result;
determine a first frame content characteristic of the data packet, the first frame content characteristic being one of a silence frame or a voice frame;
divide the voice sequence into a plurality of statements according to the first frame content characteristic;
divide the statements into frame loss events;
extract a plurality of non-voice parameters according to the frame loss events, the plurality of non-voice parameters comprising a location parameter for indicating a location of a lost frame and a discrete distribution parameter for indicating a discrete distribution of the lost frame;

evaluate voice quality of each one of the plurality of statements according to a preset voice quality evaluation model and with the non-voice parameters;

evaluate the voice quality of the voice sequence according to the voice quality of the each one of the plurality of statements to produce an evaluated voice quality for network measurement or network planning;

parse a packet header of the data packet to obtain the parse result, the parse result comprising a duration of the voice sequence, a bit quantity of the voice sequence, a frame loss location, and a voice load;

perform adaptive multi-rate (AMR) decoding according to the voice load to obtain an AMR-decoded voice signal;

calculate a frame energy and an average frame energy of each frame in the AMR-decoded voice signal according to the duration of the voice sequence and the bit quantity of the voice sequence;

determine, in the data packet according to the frame loss location, a frame loss part that needs to be detected;

determine a second frame content characteristic of a previous adjacent non-lost frame and a third frame content characteristic of a subsequent adjacent non-lost frame of the frame loss part according to the frame energy and the average frame energy;

determine a fourth frame content characteristic of the frame loss part according to the second frame content characteristic and the third frame content characteristic;

determine that the non-lost frame is a silence frame when a frame energy of the non-lost frame is less than or equal to zero;

determine that the non-lost frame is a non-key voice frame when the frame energy is greater than zero and less than the average frame energy;

determine that the non-lost frame is a key voice frame when the frame energy is greater than the average frame energy;

determine that the frame loss part is a silence frame when both the previous adjacent non-lost frame and the subsequent adjacent non-lost frame are silence frames;

determine that the frame loss part is a key voice frame when both the previous adjacent non-lost frame and the subsequent adjacent non-lost frame are key voice frames;

determine that the frame loss part is a non-key voice frame when both the previous adjacent non-lost frame and the subsequent adjacent non-lost frame are non-key voice frames;

determine that a first half of the frame loss part is a key voice frame and a second half of the frame loss part is a non-key voice frame when the previous adjacent non-lost frame is a key voice frame and the subsequent adjacent non-lost frame is a silence frame;

determine that a first half of the frame loss part is a non-key voice frame and a second half of the frame loss part is a key voice frame when the previous adjacent non-lost frame is a silence frame and the subsequent adjacent non-lost frame is a key voice frame;

determine that the frame loss part is a key voice frame when the previous adjacent non-lost frame is a key voice frame and the subsequent adjacent non-lost frame is a non-key voice frame;

determine that the frame loss part is a key voice frame when the previous adjacent non-lost frame is a non-key voice frame and the subsequent adjacent non-lost frame is a key voice frame;

determine that the frame loss part is a non-key voice frame when the previous adjacent non-lost frame is a non-key voice frame and the subsequent adjacent non-lost frame is a silence frame; and determine that the frame loss part is a non-key voice frame when the previous adjacent non-lost frame is a silence frame and the subsequent adjacent non-lost frame is a non-key voice frame.

\* \* \* \* \*

UNITED STATES PATENT AND TRADEMARK OFFICE
CERTIFICATE OF CORRECTION

PATENT NO. : 10,284,712 B2  
APPLICATION NO. : 15/248079  
DATED : May 7, 2019  
INVENTOR(S) : Fuzhheng Yang et al.

Page 1 of 1

It is certified that error appears in the above-identified patent and that said Letters Patent is hereby corrected as shown below:

On the Title Page

Item (30), Line 1: "201410186706" should read "201410186706.1"

In the Claims

Column 55, Line 11: "toss" should read "loss"

Column 56, Line 43: "on-lost" should read "non-lost"

Column 58, Line 44: "ion-key" should read "non-key"

Signed and Sealed this  
Sixteenth Day of July, 2019

Andrei Iancu  
*Director of the United States Patent and Trademark Office*